(12) United States Patent
DeMay

(10) Patent No.: US 8,647,018 B2
(45) Date of Patent: Feb. 11, 2014

(54) FRAME RAIL ASSEMBLIES, INTERLOCKING FRAME RAIL SYSTEMS, AND RELATED METHODS

(76) Inventor: Steven Edward DeMay, Bullhead City, AZ (US)

( * ) Notice: Subject to any disclaimer, the term of this patent is extended or adjusted under 35 U.S.C. 154(b) by 111 days.

(21) Appl. No.: 13/173,378

(22) Filed: Jun. 30, 2011

(65) Prior Publication Data

US 2012/0003050 A1    Jan. 5, 2012

Related U.S. Application Data

(63) Continuation-in-part of application No. 12/644,878, filed on Dec. 22, 2009, now Pat. No. 8,480,333.

(60) Provisional application No. 61/140,905, filed on Dec. 26, 2008.

(51) Int. Cl.
*E02B 3/26*        (2006.01)
*B63B 59/02*       (2006.01)

(52) U.S. Cl.
USPC ............................... 405/212; 14/76; 114/219

(58) Field of Classification Search
USPC .............. 405/211–215; 14/75, 76; 114/219; 52/287.1, 288.1; 29/248
See application file for complete search history.

(56) References Cited

U.S. PATENT DOCUMENTS

| | | | | |
|---|---|---|---|---|
| 3,740,455 | A | * | 6/1973 | Willox .......................... 174/101 |
| 3,897,967 | A | * | 8/1975 | Barenyi ........................ 293/120 |
| 4,078,515 | A | | 3/1978 | Svirklys |
| 4,126,006 | A | | 11/1978 | Lewis |
| 4,360,549 | A | * | 11/1982 | Ozawa et al. ................... 428/31 |
| 4,548,150 | A | | 10/1985 | Drewett |
| 4,645,380 | A | | 2/1987 | Hambrick et al. |
| 4,968,182 | A | * | 11/1990 | Westwell ....................... 405/215 |
| 5,013,596 | A | * | 5/1991 | Kessler .......................... 428/100 |
| 5,027,736 | A | | 7/1991 | Drews |
| 6,217,259 | B1 | | 4/2001 | Godbersen |
| 6,536,992 | B1 | | 3/2003 | Floe |
| 7,624,694 | B2 | * | 12/2009 | Aschenbach .................. 114/219 |

* cited by examiner

*Primary Examiner* — David Bagnell
*Assistant Examiner* — Kyle Armstrong
(74) *Attorney, Agent, or Firm* — The Eclipse Group LLP

(57) ABSTRACT

A frame rail assembly for a boat dock structure includes a first frame rail member, a second frame rail member and a corner bumper member. The first frame rail member is secured to a first side of the boat dock structure and includes a first channel and a second channel The second frame rail member is secured to a second side of the boat dock structure and includes a first channel and a second channel. The corner bumper is positioned at a corner between a first end of the first frame rail member and a first end of the second frame rail member. The corner bumper member includes a first section and a second section. The first section includes coupling members engaged with the channels of the first frame rail member, and the second section includes coupling members engaged with the channels of the second frame rail member.

19 Claims, 14 Drawing Sheets

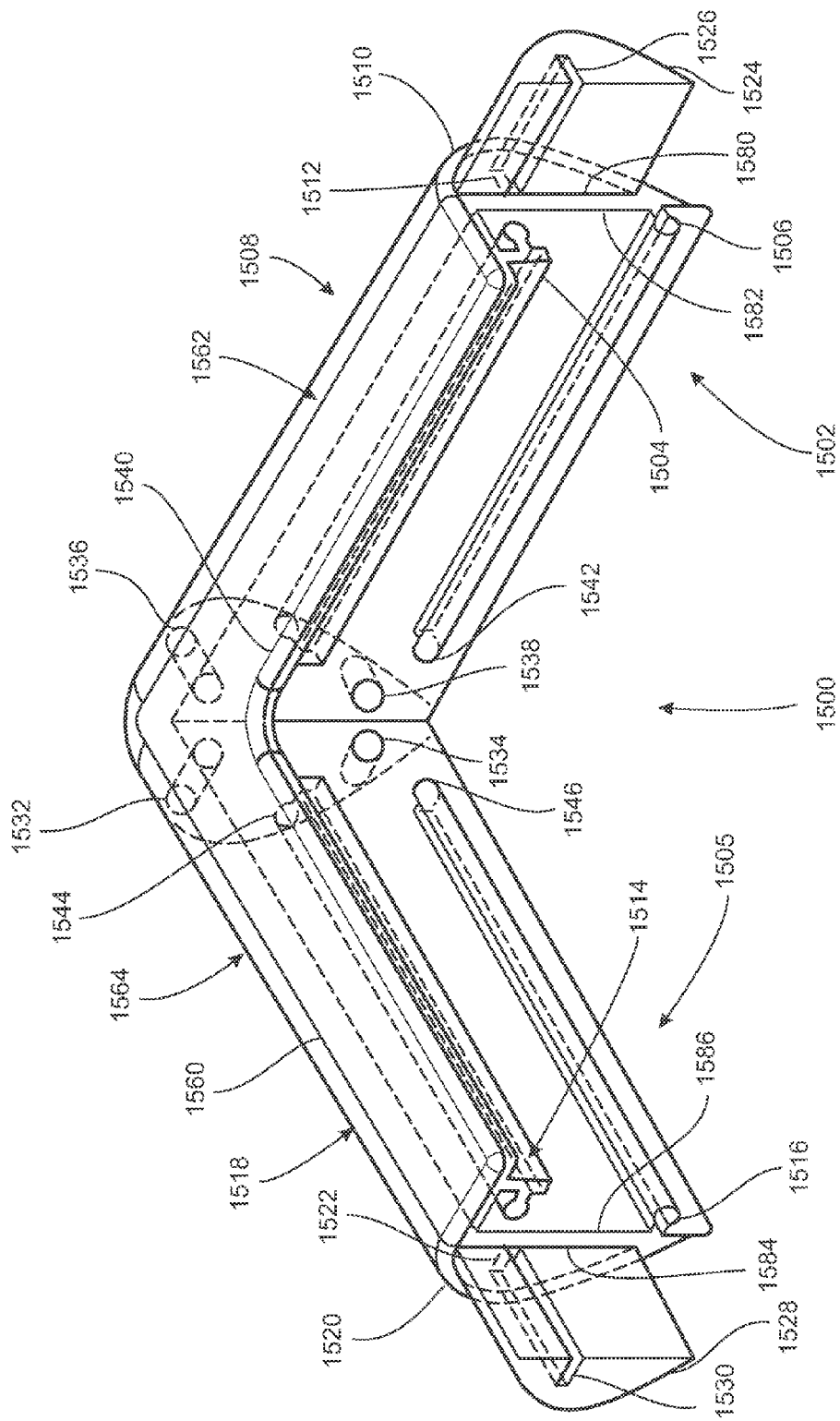

FRAME RAIL ASSEMBLIES, INTERLOCKING FRAME RAIL SYSTEMS, AND RELATED METHODS

RELATED APPLICATIONS

The present application is a continuation-in-part of co-pending U.S. patent application Ser. No. 12/644,878, filed Dec. 22, 2009, titled "FRAME RAIL ASSEMBLIES AND INTERLOCKING FRAME RAIL SYSTEMS," which claims the benefit of U.S. Provisional Patent Application Ser. No. 61/140,905, filed Dec. 26, 2008, titled "NOVEL ENHANCED MODULAR RUB-RAIL ASSEMBLY;" the content of each is incorporated by reference herein in its entirety.

BACKGROUND OF THE INVENTION

1. Field of the Invention

The present invention relates generally to frame rail assemblies for boat dock structures, and to an interlocking frame rail system for effectively and easily interlocking corresponding frame rails.

2. Related Art

Many boat dock structures are designed such that they may accommodate rub-rails. Rub-rails are often fastened to the sides of boat dock structures using mechanical fasteners, such as screws, nails, or bolts. This creates potential tear or fracture points along the rub-rails. Impact from watercraft vehicles may easily dislodge rub-rails that are mechanically fastened to the sides of boat docks. Thus, there is an ongoing need for rub-rails that may be securely coupled to the sides of boat dock structures.

Frame rails for boat docks exist in a variety of designs. A frame rail system may be designed to accommodate an existing boat dock structure; or conversely, a boat dock structure may be designed to accommodate an existing frame rail system. However, existing designs for frame rails fail to provide an effective and relatively simple means for interlocking corresponding frame rails so as to provide for the coupling of separate boat dock structures. In addition, the existing designs for frame rail systems fail to provide a means for effectively accommodating rub-rails, as described above. Thus, there is an ongoing need for frame rail systems that provide an effective means for interlocking corresponding frame rails. There is also an ongoing need for frame rails that provide for the effective accommodation of rub-rails.

SUMMARY

To address the foregoing problems, in whole or in part, and/or other problems that may have been observed by persons skilled in the art, the present disclosure provides methods, apparatus, instruments, and/or devices, as described by way of example in implementations set forth below.

According to one implementation, a frame rail assembly for a boat dock structure includes a frame rail member and a first removable resilient rub-rail member. The frame rail member includes a first side, a second side opposing the first side, a first channel extending along a length of the frame rail member, and a second channel below the first channel and extending along the length of the frame rail member. The first rub-rail member may project outward from the second side and may extend along at least a portion of the length of the frame rail member. The first rub-rail member includes a first coupling member extending through the first channel in engagement therewith, and a second coupling member extending through the second channel in engagement therewith.

According to another implementation, an interlocking frame rail system for boat dock structures includes a first frame rail member, a second frame rail member, and an upper connector member extending along at least a portion of the length of the first frame rail member and at least a portion of the length of the second frame rail member. The first frame rail member may include a first side configured for securing the first frame rail member to a side of a first boat dock structure, a second side opposing the first side, a first channel extending along the length of the first frame rail member, and a second channel below the first channel and extending along the length of the first frame rail member. The second frame rail member may include a first side configured for securing the second frame rail member to a side of a second boat dock structure, a second side opposing the first side, a first channel extending along the length of the second frame rail member, and a second channel below the first channel and extending along the length of the second frame rail member. The upper connector member may include a first coupling member extending through the first channel of the first frame rail member in removable engagement therewith, and a second coupling member extending through the first channel of the second frame rail member in removable engagement therewith.

According to another implementation, a method for interlocking boat dock structures includes aligning a first frame rail member with a second frame rail member, securing the first frame rail member to a side of the first boat dock structure, securing the second frame rail member to a side of the second boat dock structure, and coupling the first frame rail member to the second frame rail member by removably engaging a first coupling member of an upper connector member with a first channel of the first frame rail member and removably engaging a second coupling member of the upper connector member with a first channel of the second frame rail member.

According to another implementation, a corner bumper member for a boat dock structure includes a first section and a second section. The first section includes a first coupling member, a second coupling member and a resilient rub-rail portion. The first coupling member of the first section is configured for extending through a first channel of a first frame rail member of the boat dock structure. The second coupling member of the first section is configured for extending though a second channel of the first frame rail member. The rub-rail portion of the first section projects outward from the first frame rail member. The second section includes a first coupling member, a second coupling member and a resilient rub-rail portion. The first coupling member of the second section is configured for extending through a first channel of a second frame rail member of the boat dock structure. The second coupling member of the second section is configured for extending through a second channel of the second frame rail member. The rub-rail portion of the second section projects outward from the second frame rail member. The first section adjoins the second section at a corner.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood by referring to the following figures. The components in the figures are not necessarily to scale, emphasis instead being placed upon illustrating the principles of the invention. In the figures, like reference numerals designate corresponding parts throughout the different views.

FIG. 15 is a perspective view of a corner bumper member for use in conjunction with the frame rail assembly shown in FIG. 14 at a corner of a boat dock structure.

DETAILED DESCRIPTION

Figure 1:
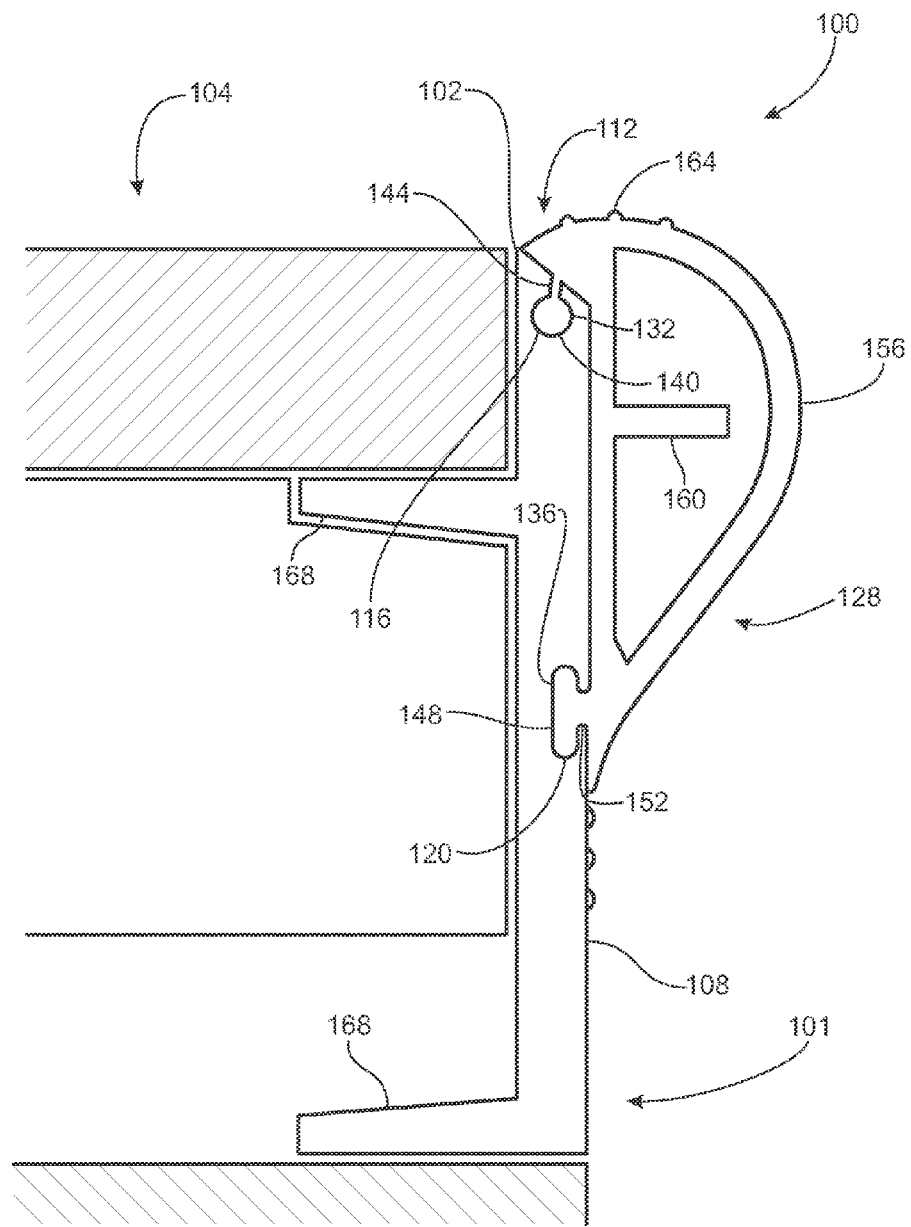
FIG. 1 is a cut-away view of a portion of an implementation of a frame rail assembly according to the present invention, showing a frame rail member secured to a side of a boat dock structure.

FIG. 1 is a cut-away view of a portion of an implementation of a frame rail assembly 100 according to the present invention, showing a frame rail member 101 secured to a side of a boat dock structure 104. The frame rail assembly 100 may generally include the frame rail member 101 and a removable resilient rub-rail member 128. The frame rail member 101 generally includes a first side 102 configured for securing the frame rail member 101 to the side of the boat dock structure 104, a second side 108 opposing the first side 102, a first channel 116 extending along a length of the frame rail member 101, and a second channel 120 extending along the length of the frame rail member 101.

As illustrated in FIG. 1, the rub-rail member 128 may project outward from the second side 108. The rub-rail member 128 generally extends along at least a portion of the length of the frame rail member 101. The rub-rail member 128 may include a first coupling member 132 extending through the first channel 116 in engagement therewith, and a second coupling member 136 extending through the second channel 120 in engagement therewith. The first coupling member 132 and the second coupling member 136 generally extend continuously along a length of the rub-rail member 128. As also illustrated in FIG. 1, the first channel 116 may include an inner section 140 and an outer section 144 that opens at an outer surface of the frame rail member 101, where the inner section 140 has a larger cross-sectional area than the outer section 144. As further illustrated in FIG, 1, in some implementations a top surface 112 of the frame rail member 101 may be sloped and the outer section 144 of the first channel 116 may open at the top surface 112. The second channel 120 may include an inner section 148 and an outer section 152 that opens at an outer surface of the frame rail member 101, where the inner section 148 has a larger cross-sectional area than the outer section 152. The shapes of the first coupling member 132 and the second coupling member 136 may be complementary to the respective shapes of the first channel 116 and the second channel 120, such that the nib-rail member 128 may be limited to longitudinal insertion and removal by, e.g., slidably inserting the rub-rail member 128 into the frame rail member 101 or slidably removing the rub-rail member 128 from the frame rail member 101. For instance, the coupling members 132, 136 may not be removed by pulling them out from the frame rail member 101 in a direction perpendicular to the length of the frame rail member 101. The rub-rail member 128 may include an outer bumper shell 156 projecting outward from the second side 108 of the frame rail member 101, and an inner rib 160 disposed inside the outer bumper shell 156. The inner rib 160 may be configured for supporting the outer bumper shell 156 upon heavy impact, and may be oriented so as to be less deformable than the outer bumper shell 156. For example, the inner rib 160 may project outward from the frame rail member 101 such that the inner rib 160 conies into contact with the outer bumper shell 156 upon. heavy impact, thus creating a support mechanism for keeping the outer bumper shell 156 from coming into contact with the frame rail member 101 upon heavy impact from watercraft vehicles. The rub-rail member 128 may include at least one raised ridge 164 for improved traction. The removable rub-rail member 128 may be constructed from, for example, high-density polyurethane, polyethylene, or various other types of polymers.

The frame rail member 101 may be made of, for example, extruded aluminum with engineered first and second channels 116, 120. As illustrated in FIG. 1, the frame rail member 101 may include one or more toe members 168 for securing the first side 102 of the frame rail member 101 to the side of the boat dock structure 104. The frame rail member 101 may be configured such that a user may subsequently construct the boat dock structure 104 to accommodate the frame rail member 101; or the user may secure a frame rail to an existing side of a boat dock structure (as discussed below with respect to FIG. 5). Those of skill in the art will appreciate that the frame rail member 101 may be secured to the side of the boat dock structure 104 by any suitable means.

It will be understood that the term "boat dock structure" is not meant to limit the scope of the invention to use in conjunction with boat dock structures such as boat docks, fingers and headwalks. The term "boat dock structure" as used herein may encompass any and all types of structures that may utilize the present invention, such as, for example, automobile trailers, buildings and the like.

Figure 2:
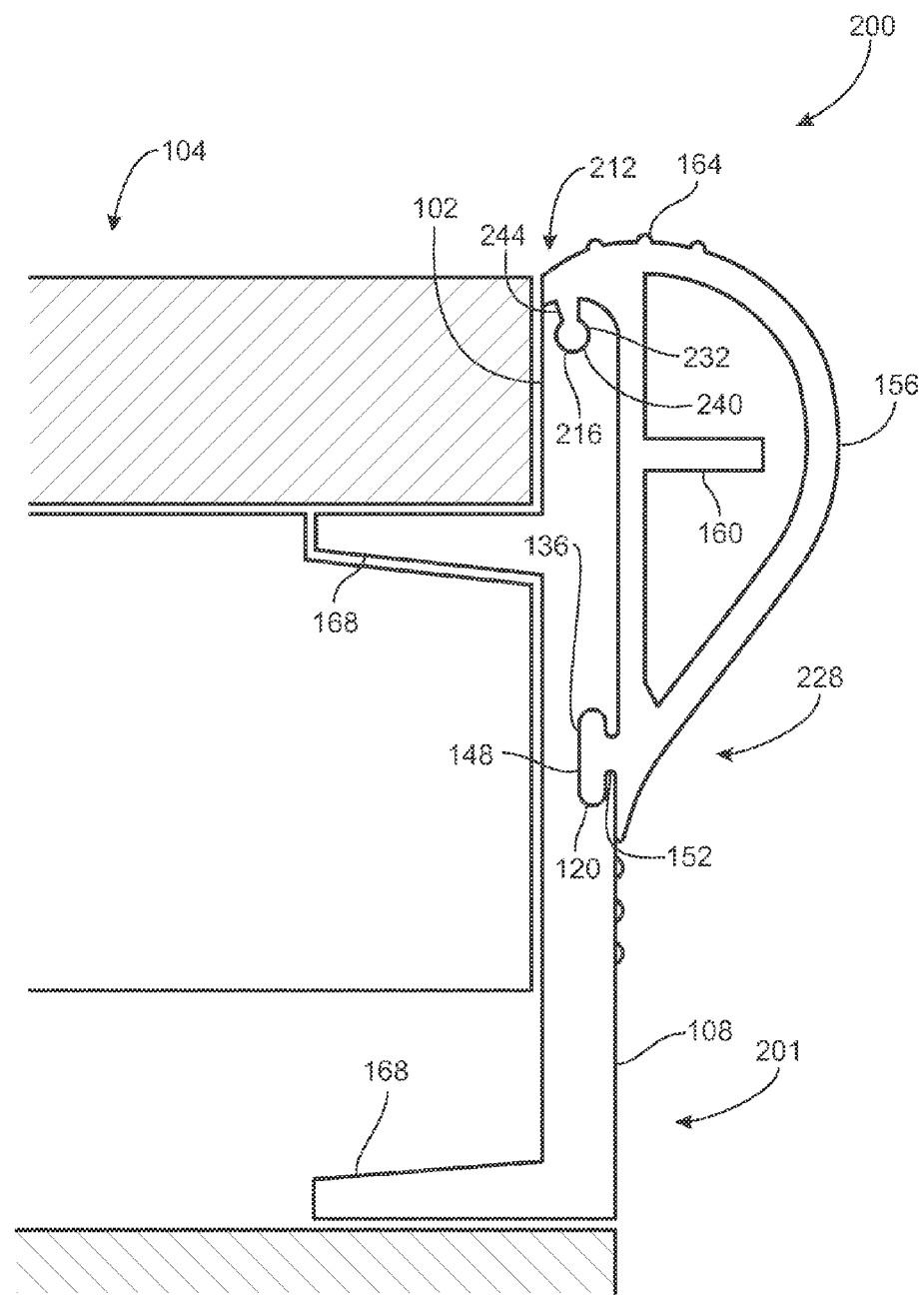
FIG. 2 is a cut-away view of a portion of another implementation of a frame rail assembly according to the present invention, showing a frame rail member secured to a side of a boat dock structure.

FIG. 2 is a cut-away view of a portion of another implementation of a frame rail assembly 200 according to the present invention, showing a frame rail member 201 secured to a side of the boat dock structure 104. FIG. 2 illustrates a rounded top surface 212 of the frame rail member 201 and an alternative location for a first channel 216 of the frame rail member 201, and accordingly illustrates an outer section 244 and an inner section 240 of the first channel 216. In the present example, the outer section 240 of the first channel 216 opens at the rounded top surface 212 of the frame rail member 201. In the present implementation illustrated in FIG. 2, a first coupling member 232 of a removable rub-rail member 228 is complementary in shape to the first channel 216 of the frame rail member 201, thus limiting the rub-rail member 228 to longitudinal insertion into and removal from the frame rail member 201. The frame rail assembly 200 may be utilized as described above with respect to FIG. 1, or as otherwise described herein.

Figure 3:
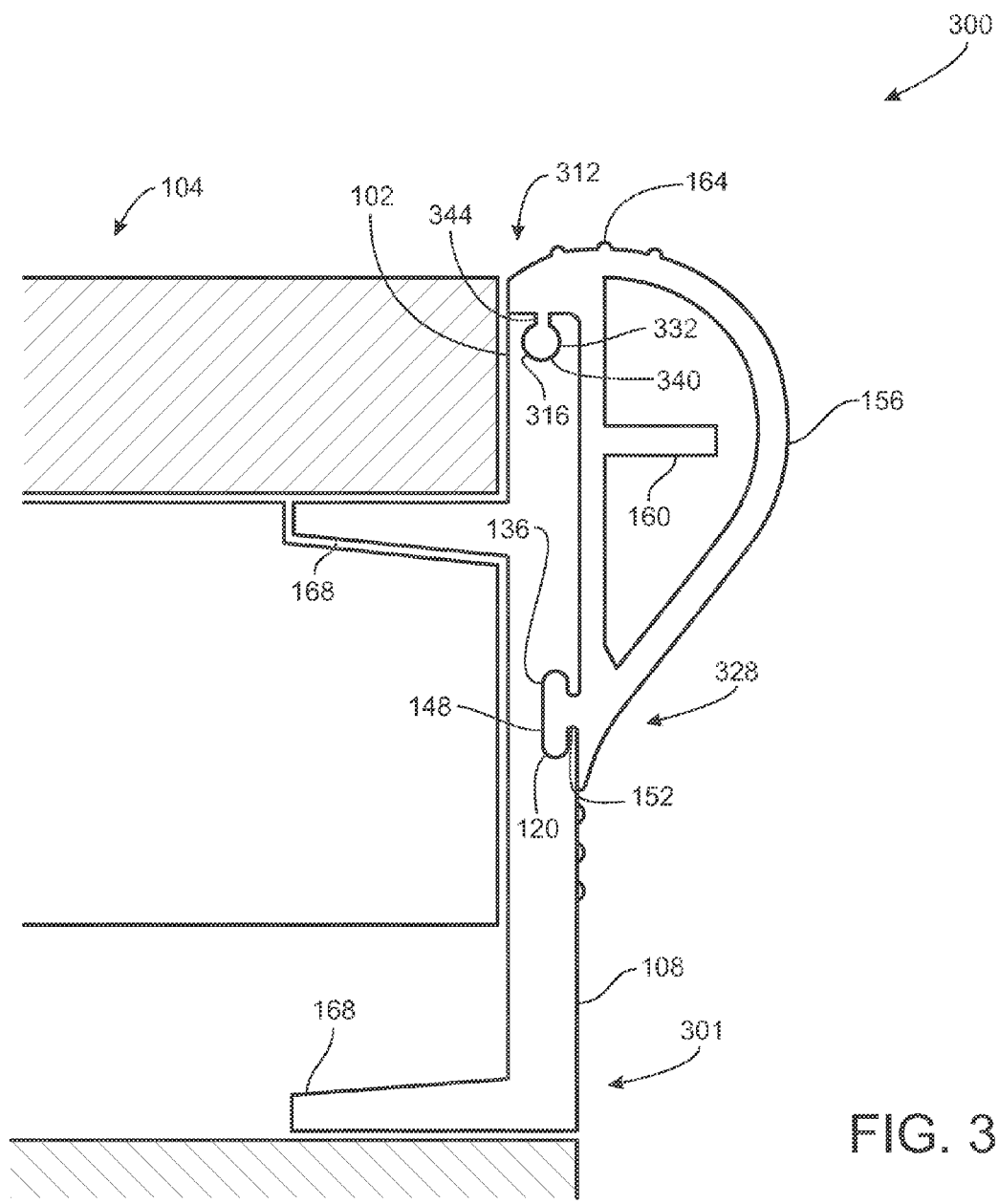
FIG. 3 is a cut-away view of a portion of another implementation of a frame rail assembly according to the present invention, showing a frame rail member secured to a side of a boat dock structure.

FIG. 3 is a cut-away view of a portion of another implementation of a frame rail assembly 300 according to the present invention, showing a frame rail member 301 secured to a side of the boat dock structure 104. FIG. 3 illustrates a substantially flat top surface 312 of the frame rail member 301 and an alternative location for a first channel 316 of the frame rail member 301, and accordingly illustrates an outer section 344 and an inner section 340 of the first channel 316. In the present example, the outer section 340 of the first channel 316 opens at the substantially flat top surface 312 of the frame rail member 301. The first channel 316 extends from the top surface 312 of the frame rail member 301 in a direction perpendicular to the length of the frame rail member 301. A first coupling member 332 of a removable rub-rail member 328 is complementary in shape to the first channel 316 of the frame rail member 301, thus limiting the rub-rail member 328 to longitudinal insertion into and removal from the frame rail member 301. The frame rail assembly 300 may be utilized as described above with respect to FIG. 1 and FIG, 2, or as otherwise described herein.

Figure 4:
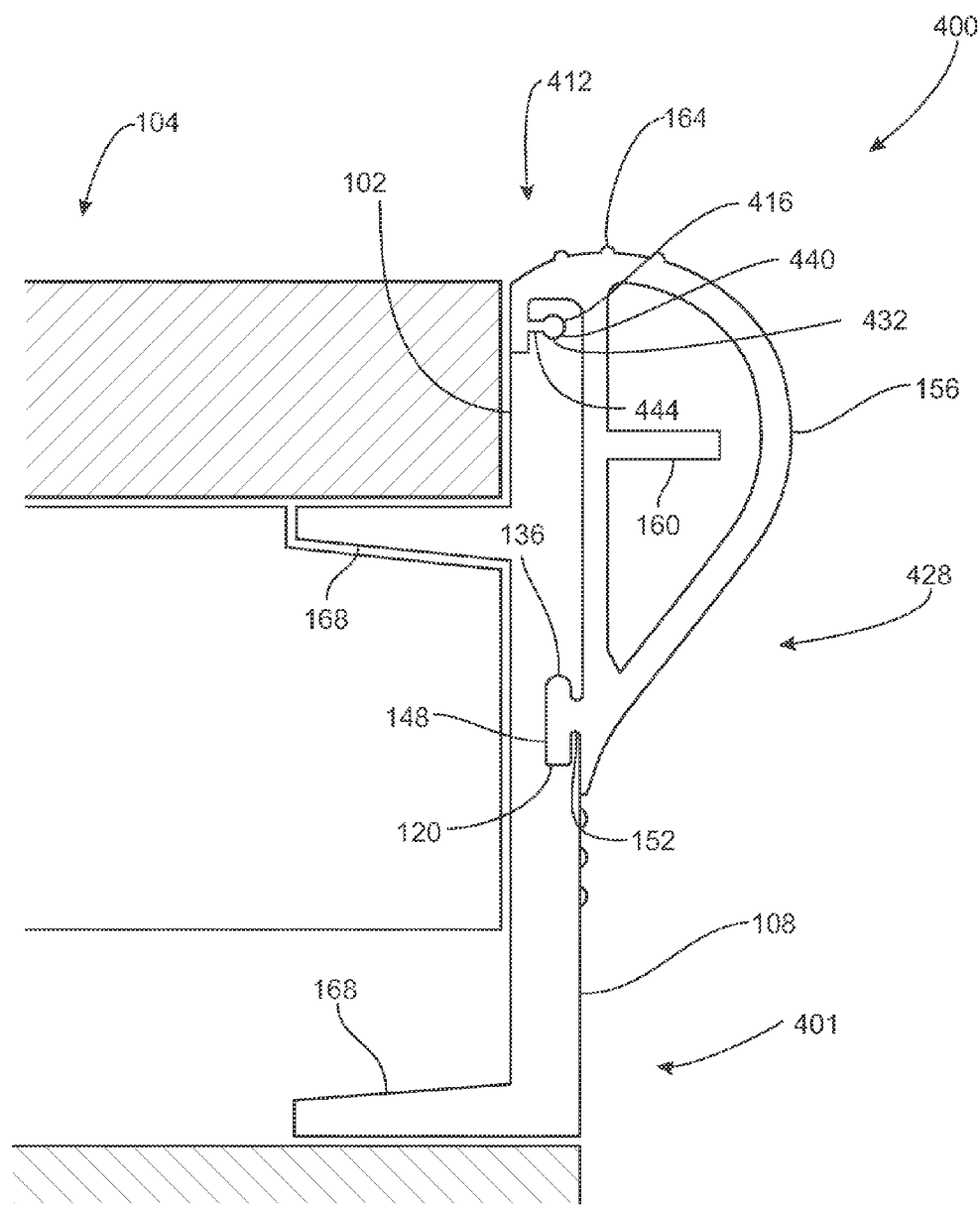
FIG. 4 is a cut-away view of a portion of another implementation of a frame rail assembly according to the present invention, showing a frame rail member secured to a side of a boat dock structure.

FIG. 4 is a cut-away view of a portion of another implementation of a frame rail assembly 400 according to the present invention, showing a frame rail member 401 secured to a side of the boat dock structure 104. FIG. 4 illustrates a section 412 of a removable rub-rail member 428 adjacent to the first side 102 of the frame rail member 401 and interposed between the first side 102 of the frame rail member 401 and the side of the boat dock structure 104. FIG. 4 illustrates an alternative location for a first channel 416 of the frame rail member 401, and accordingly illustrates an outer section 444 and an inner section 440 of the first channel 416. The outer section 444 of the first channel 416 opens to the first side 102 of the frame rail member 401. A first coupling member 432 of the removable rub-rail member 428 is complementary in shape to the first channel 416 of the frame rail member 401, thus limiting the rub-rail member 428 to longitudinal insertion into and removal from the frame rail member 401. The flame rail assembly 400 may be utilized as described above with respect to FIGS. 1 through 3, or as otherwise described herein.

Figure 5:
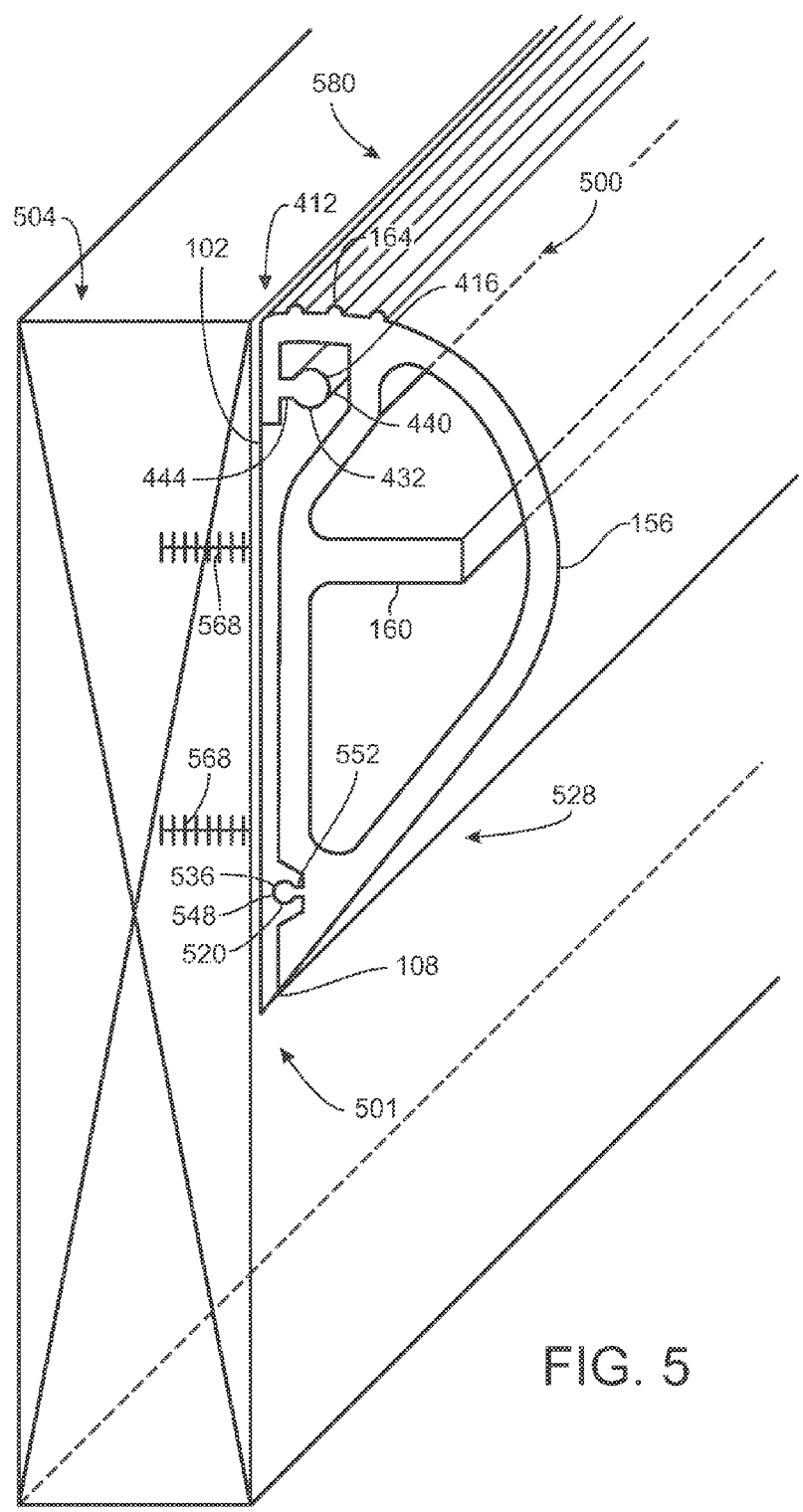
FIG. 5 is a perspective view of a portion of another implementation of a frame rail assembly according to the present invention, showing a frame rail member secured to a side of a boat dock structure.

FIG. 5 is a cut-away view of a portion of another implementation of a frame rail assembly 500 according to the present invention, showing a frame rail member 501 secured to a side of a boat dock structure 504. FIG. 5 illustrates an alternative shape for a second channel 520 of the frame rail member 501, and accordingly illustrates an outer section 552 and an inner section 548 of the second channel 520. A second coupling member 536 of a removable rub-rail member 528 may be complementary in shape to the second channel 520 of the frame rail member 501, thus limiting the rub-rail member 528 to longitudinal insertion into and removal from the frame rail member 501. As also illustrated in FIG. 5, a user may secure the frame rail member 501 (or any of the other frame rail members 101, 201, 301, 401) to the side of an existing boat dock structure 504 through the use of mechanical fasteners, such as counter-set screws 568, nails, or the like, or, for example, through welding. Alternatively, the frame rail member 501 may be configured such that a user may subsequently construct a boat dock structure to accommodate the frame rail member 501, as previously noted. All such methods entailing the use of the frame rail member 501 are encompassed by the present invention.

Figure 6:
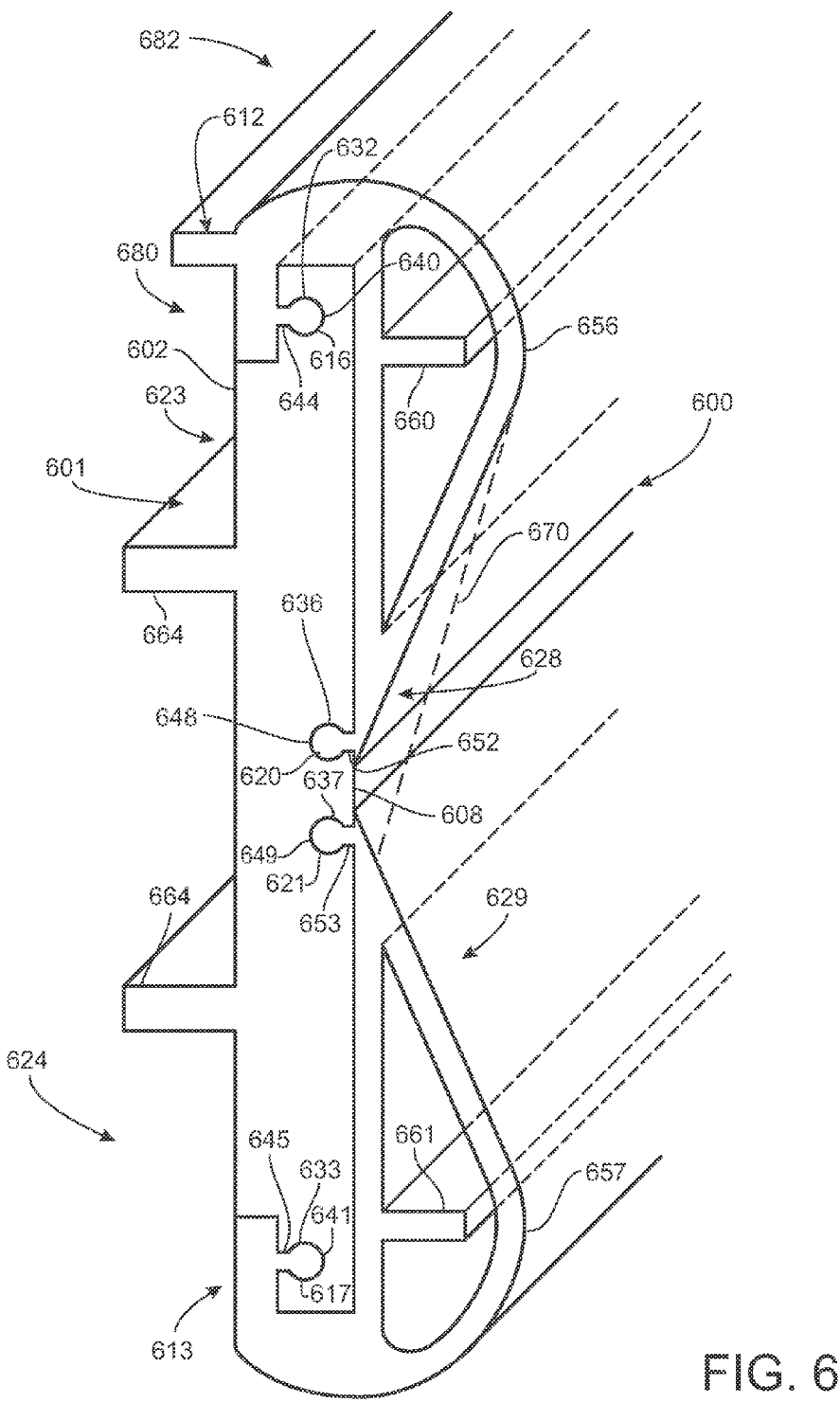
FIG. 6 is a perspective view of a portion of another implementation of a frame rail assembly according to the present invention, showing first and second rub-rail members.

FIG. 6 is a cut-away view of a portion of another implementation of a frame rail assembly 600 according to the present invention, showing a first rub-rail member 628 and a second rub-rail member 629. As illustrated in FIG. 6, the frame rail assembly 600 may generally include a frame rail member 601, the first removable resilient rub-rail member 628, and the second removable resilient rub-rail member 629. The frame rail member 601 may include a first side 602 configured for securing the frame rail member 601 to a side of a boat dock structure, a second side 608 opposing the first side 602, an upper section 623 between the first side 602 and the second side 608, a first channel 616 extending along a length of the frame rail member 601, a second channel 620 extending along the length of the frame rail member 601, and a lower section 624 between the first side 602 and the second side 608. The first channel 616 may generally be located in the upper section 623 of the frame rail member 601. The second channel 620 may generally be located below the first channel 616. The first rub-rail member 628 generally projects outward from the second side 608 and extends along at least a portion of the length of the frame rail member 601. The first rub-rail member 628 may include a first coupling member 632 extending through the first channel 616 in engagement therewith, and a second coupling member 636 extending through the second channel 620 in engagement therewith. The first channel 616 may include an inner section 640 and an outer section 644, where the inner section 640 has a larger cross-sectional area than the outer section 644. The second channel 620 may include an inner section 648 and an outer section 652, where the inner section 648 has a larger cross-sectional area than the outer section 652. The shapes of the first coupling member 632 and the second coupling member 636 may be complementary to the respective shapes of the first channel 616 and the second channel 620, such that the first rub-rail member 628 may be limited to longitudinal insertion and removal. The first rub-rail member 628 may include an outer bumper shell 656 projecting outward from the second side 608 of the frame rail member 601, and an inner rib 660 disposed inside the outer bumper shell 656. The inner rib 660 may generally be configured for supporting the outer bumper shell 656 upon heavy impact, and may be oriented so as to be less deformable than the outer bumper shell 656.

As further illustrated in FIG. 6, the frame rail member 601 may generally include a third channel 617 in the lower section 624 of the frame rail member 601 extending along the length of the frame rail member 601, a fourth channel 621 generally located above the third channel 617 and extending along the length of the frame rail member 601, and the second removable resilient rub-rail member 629 projecting outward from the second side 608 of the frame rail member 601 and extending along at least a portion of the length of the frame rail member 601. The second rub-rail member 629 may include a third coupling member 633 extending through the third channel 617 in engagement therewith, and a fourth coupling member 637 extending through the fourth channel 621 in engagement therewith. The third channel 617 may include an inner section 641 and an outer section 645, where the inner section 641 has a larger cross-sectional area that the outer section 645. The fourth channel 621 may include an inner section 649 and an outer section 653, where the inner section 649 has a larger cross-sectional area than the outer section 653. The shapes of the third coupling member 633 and the fourth coupling member 637 may be complementary to the respective shapes of the third channel 617 and the fourth channel 621, such that the second rub-rail member 629 may be limited to longitudinal insertion and removal. The second rub-rail member 629 may include an outer bumper shell 657 projecting outward from the second side 608 of the frame rail member 601, and an inner rib 661 disposed inside the outer bumper shell 657. The inner rib 661 may generally be configured for supporting the outer bumper shell 657 upon heavy impact, and may be oriented so as to be less deformable than the outer bumper shell 657.

As further illustrated in FIG. 6, the first rub rail member 628 may include a section 680 that is adjacent to the first side 602 of the frame rail member 601 and which may be interposed between the first side 602 of the frame rail member 601 and the side of the boat dock structure (not shown). The first rub rail member 628 may include a lip 612 that is continuous along a top portion 682 of the first rub rail member 628. The lip 612 may extend inward from the first side 602 of the frame rail member 601. The lip 612 may generally be configured for covering a portion of a top surface (see the top surface 580 in FIG. 5, for example) of the boat dock structure (not shown). For example, the lip 612 may be utilized to hide imperfections in the ends of boards forming the top surface of the boat dock structure. The second rub-rail member 629 may include a section 613 that is adjacent to the first side 602 of the frame rail member 601 and which may be interposed between the first side 602 of the frame rail member 601 and the side of the boat dock structure (not shown).

Those skilled in the art will recognize that the frame rail member 601 may be configured to accommodate one rub-rail member, or a plurality of rub-rail members. For example, in one implementation, the second rub-rail member 629 may be removed from the frame rail assembly 600. The first rub-rail member 628 may be configured such that the outer bumper shell extends below the fourth channel 621, so as to cover, or partially cover the fourth channel 621, as illustrated by a phantom line 670. Those skilled in the art will also recognize that the frame rail members described herein may be utilized in conjunction with the interlocking frame rail system described below. As but one example, and as will become evident from the discussion below, the first rub-rail member 628 and the second rub-rail member 629 may be removed from the frame rail member 601, and the frame rail member 601 may be interlocked with a corresponding frame rail member.

Figure 7:
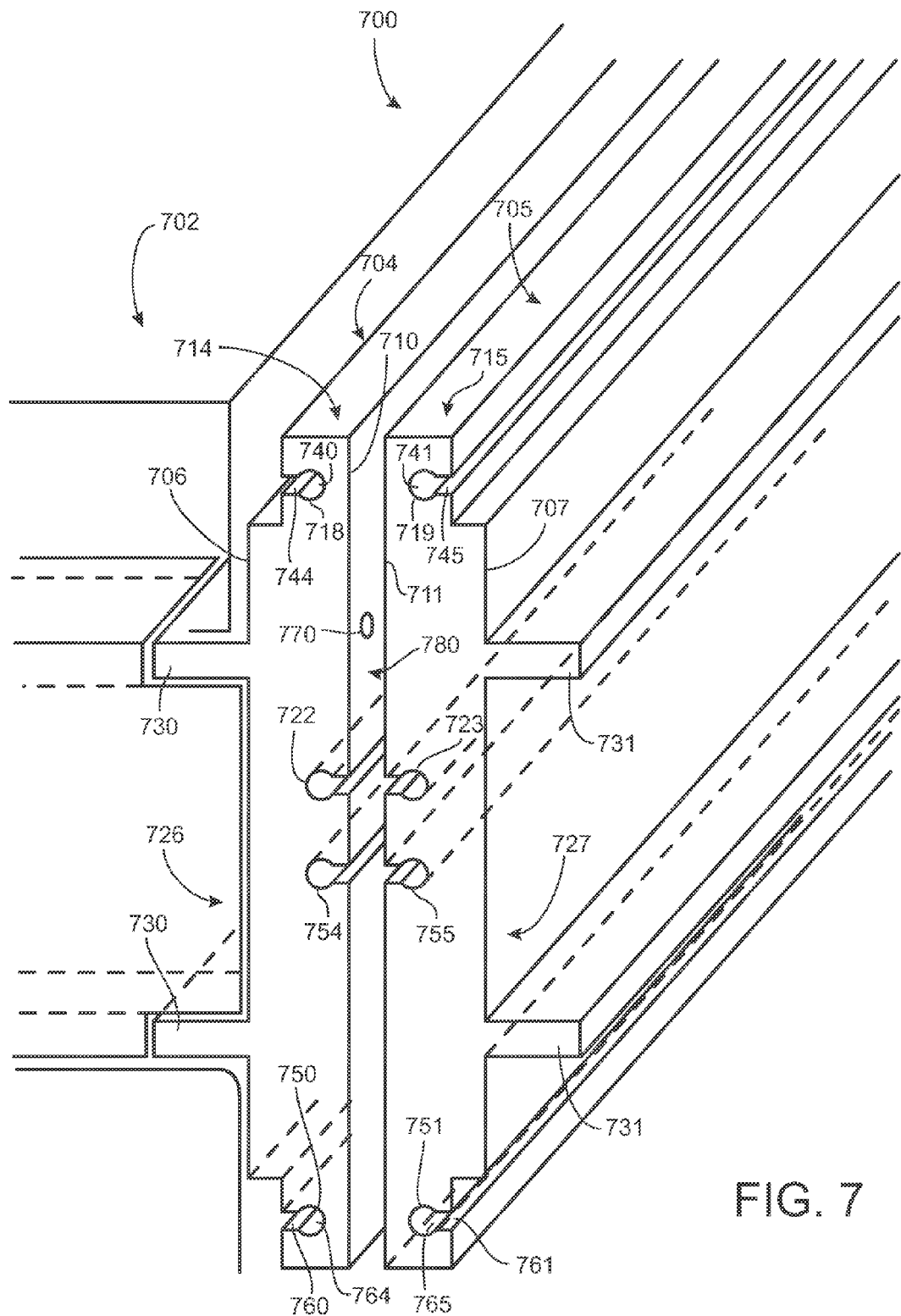
FIG. 7 is a perspective view of an interlocking frame rail system according to the present invention, showing a portion of a first frame rail member and a portion of a second frame rail member.

FIG. 7 is a perspective view of an interlocking frame rail system 700 according to the present invention, showing a portion of a first frame rail member 704 and a portion of a second frame rail member 705. In some implementations, the interlocking flame rail system 700 may include a first frame rail member 704, a second frame rail member 705, and a connector member (not shown). The first frame rail member 704 may generally include a first side 706 configured for securing the first frame rail member 704 to a side of a first boat dock structure 702, a second side 710 opposing the first side 706, an upper section 714 between the first side 706 and the second side 710, a first channel (or upper channel) 718 in the upper section 714 and extending along a length of the first frame rail member 704, a second channel (or first intermediate channel) 722 extending along the length of the first frame rail member 704, and a lower section 726 between the first side 706 and the second side 710. The second channel 722 may generally be located below the first channel 718. The first channel 718 may include an inner section 740 and an outer section 744, the inner section 740 having a larger cross-sectional area than the outer section 744.

In the present example, the second frame rail member 705 may generally include a first side 707 configured for securing the second frame rail member 705 to a side of a second boat dock structure (not shown), a second side 711 opposing the first side 707, an upper section 715 between the first side 707 and the second side 711, a first channel (or upper channel) 719 in the upper section 715 and extending along a length of the second frame rail member 705, a second channel (or first intermediate channel) 723 extending along the length of the second frame rail member 705, and a lower section 727 between the first side 707 and the second side 711. The second channel 723 may generally be located below the first channel 719. The first channel 719 may include an inner section 741 and an outer section 745, the inner section 741 having a larger cross-sectional area than the outer section 745.

As illustrated in FIG. 7, the first frame rail member 704 may include a third channel (or lower channel) 750 extending along the length of the first frame rail member 704 in the lower section 726 of the first frame rail member 704, and a fourth channel (or second intermediate channel) 754 above the third channel 750, the fourth channel 754 extending along the length of the first frame rail member 704. The third channel 750 may include an inner section 764 and an outer section 760, the inner section 764 having a larger cross-sectional area than the outer section 760.

As further illustrated in FIG. 7, the second frame rail member 705 may include a third channel (or lower channel) 751 extending along the length of the second frame rail member 705 in the lower section 727 of the second frame rail member 705, and a fourth channel (or second intermediate channel) 755 above the third channel 751, the fourth channel 755 extending along the length of the second frame rail member 705. The third channel 751 may include an inner section 765 and an outer section 761, the inner section 765 having a larger cross-sectional area than the outer section 761.

Figure 8:
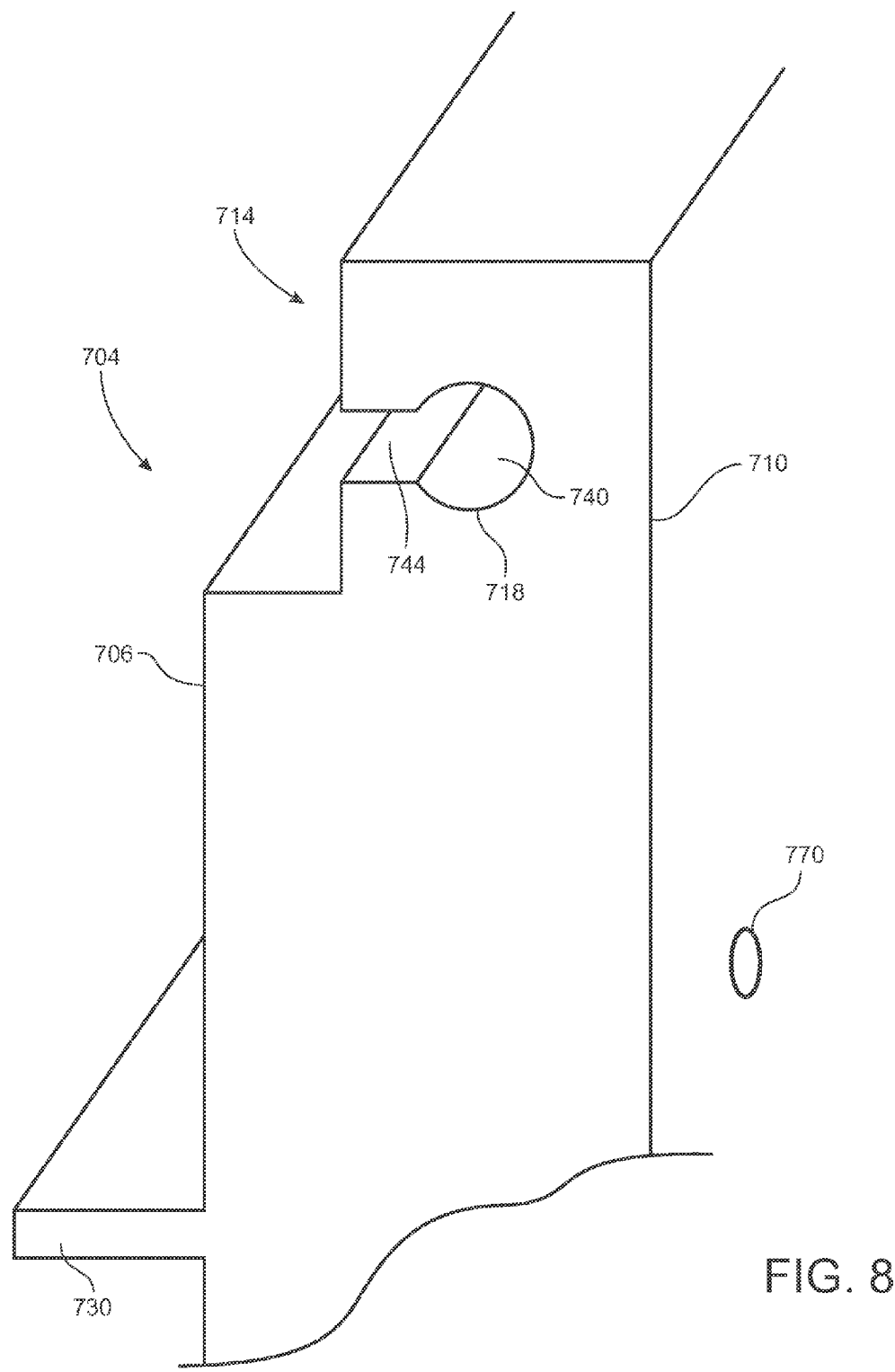
FIG. 8 is a perspective view of a portion of the first frame rail member illustrated in FIG. 7.

FIG. 8 is a perspective view of a portion of the first frame rail member 704 illustrated in FIG. 7. As illustrated in FIG. 7 and FIG. 8, in some implementations, the first frame rail member 704 may include at least one structural member 730 (e.g., a toe member or other suitable structural formation) for securing the first side 706 of the first frame rail member 704 to the side of the first boat dock structure 702 (as shown in FIG. 7).

Figure 9:
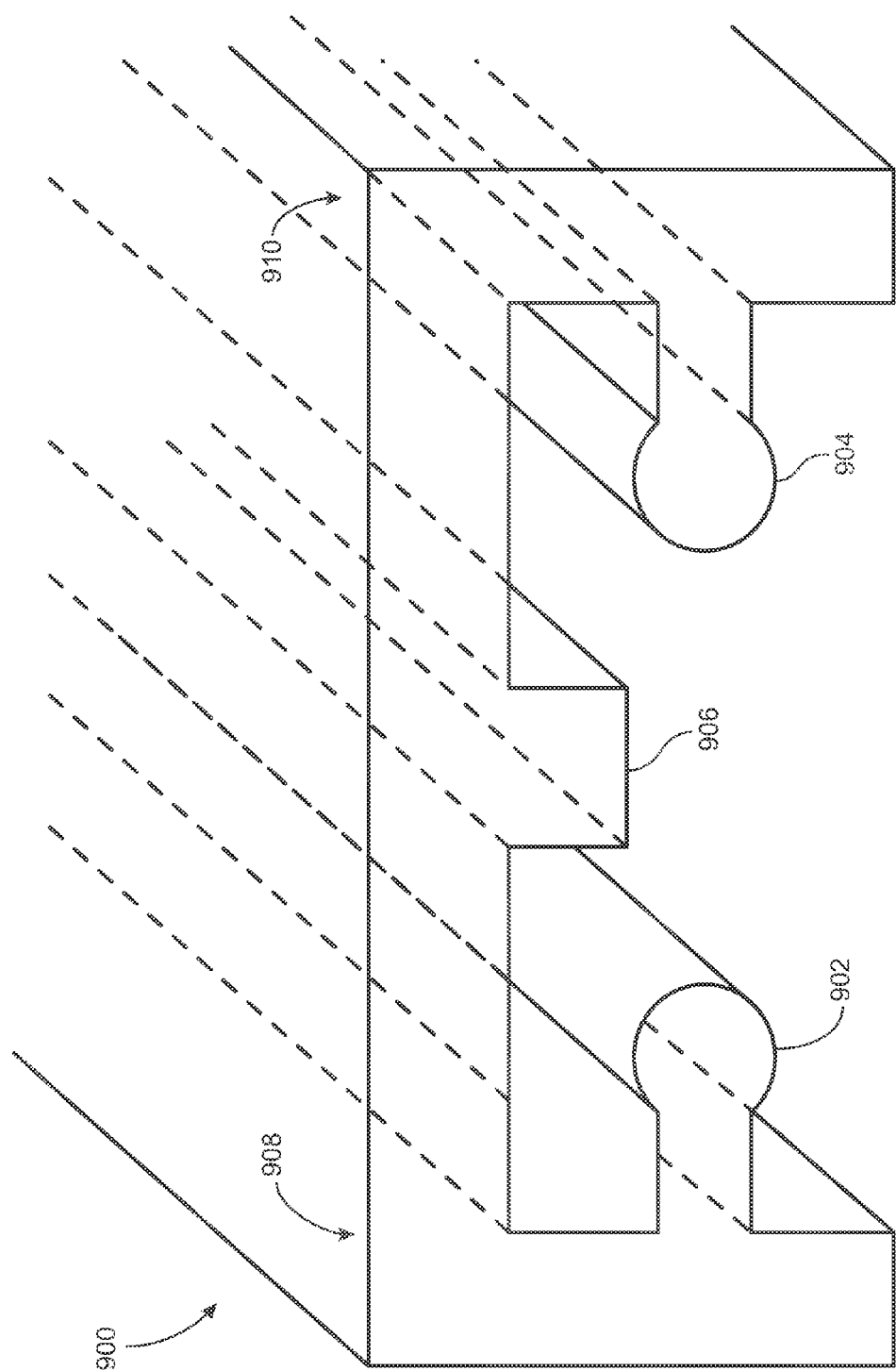
FIG. 9 is a perspective view of a portion of a connector member that may be utilized in an interlocking frame rail system according to the present invention.

FIG. 9 is a perspective view of a portion of the connector member 900 that may be utilized in the interlocking frame rail system 700 according to the present invention. The connector member 900 illustrated in FIG. 9 may be used to interlock the first frame rail member 704 and the second frame rail member 705 shown in FIG. 7. The connector member 900 may include a first coupling member 902 and a second coupling member 904. The first coupling member 902 and the second coupling member 904 may extend continuously along the length of the connector member 900. An interlocking frame rail system 700 according to the present invention may include an upper connector member and a lower connector member, one or both of which may be configured as the illustrated connector member 900. Alternatively, the interlocking frame rail system 700 may include only an upper connector member, or only a lower connector member. When the connector member 900 is utilized as an upper connector member, the connector member 900 may extend along at least a portion of the length of the first frame rail member 704 and at least a portion of the length of the second frame rail member 705. The first coupling member 902 may extend through the first channel 718 of the first frame rail member 704 in removable engagement therewith, and the second coupling member 904 may extend through the first channel 719 of the second frame rail member 705 in removable engagement therewith. The first coupling member 902 may be complementary in shape to the first channel 718 of the first frame rail member 704, and the second coupling member 904 may be complementary in shape to the first channel 719 of the second frame rail member 705, thus limiting the connector member to longitudinal insertion into and removal from the first and second frame rail members 704, 705.

Continuing with the present example, when the connector member 900 is utilized as a lower connector member, the connector member 900 may extend along at least a portion of the length of the first frame rail member 704 and at least a portion of the length of the second frame rail member 705. The first coupling member 902 may extend through the third channel 750 of the first frame rail member 704 in removable engagement therewith, and the second coupling member 904 may extend through the third channel 751 of the second frame rail member 705 in removable engagement therewith. The first coupling member 902 may be complementary in shape to the third channel 750 of the first frame rail member 704, and the second coupling member 904 may be complementary in shape to the third channel 751 of the second frame rail member 705, thus limiting the connector member 900 to longitudinal insertion into and removal from the first and second frame rail members 704, 705.

Those of skill in the art will appreciate that the connector member 900 may be constructed of various materials, such as extruded aluminum or various types of polymeric materials, including resilient materials. The connector member 900 may also include a projection 906 that may act as a spacer between the first frame rail member 704 and the second frame rail member 705.

Figure 10:
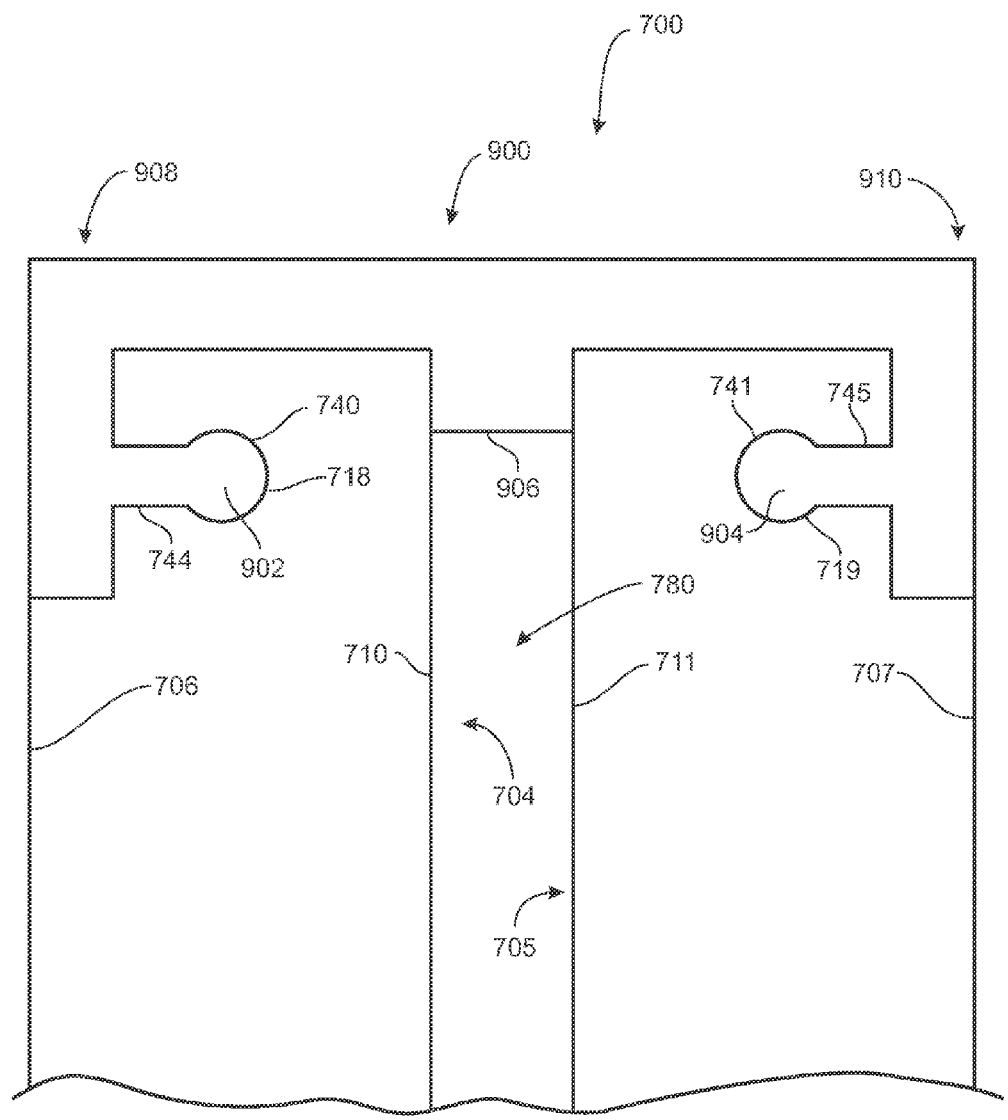
FIG. 10 is a perspective view of the interlocking frame rail system illustrated in FIG. 7 and the connector member illustrated in FIG. 9.

FIG. 10 is an elevation view of the interlocking frame rail system 700 illustrated in FIG. 7 and the connector member 900 illustrated in FIG. 9, showing the first coupling member 902 of the connector member 900 extending through the first channel 718 of the first frame rail member 704 in removable engagement therewith, and the second coupling member 904 of the connector member 900 extending through the first channel 719 of the second flume rail member 705 in removable engagement therewith. As illustrated in FIG. 10, the first coupling member 902 is shaped complementarily to the first channel 718 of the first frame rail member 704, and the second coupling member 904 is shaped complementarily to the first channel 719 of the second frame rail member 705, thus limiting the connector member 900 to longitudinal insertion into and removal from the first and second frame rail members 704, 705. The projection 906 of the connector member 900 acts as a spacer between the first frame rail member 704 and the second frame rail member 705, and extends into a gap 780 between the second side 710 of the first frame rail member 704 and the second side 711 of the second frame rail member 705. As also illustrated in FIG. 10, the connector member 900 may include a first section 908 that is adjacent to the first side 706 of the first frame rail member 704 and which may be interposed between the first side 706 of the first frame rail member 704 and the side of the first boat dock structure 702. The connector member 900 may include a second section 910 that is adjacent to the first side 707 of the second frame rail member 705 and which may be interposed between the first side 707 of the second frame rail member 705 and the side of the second boat dock structure (not shown).

Figure 11:
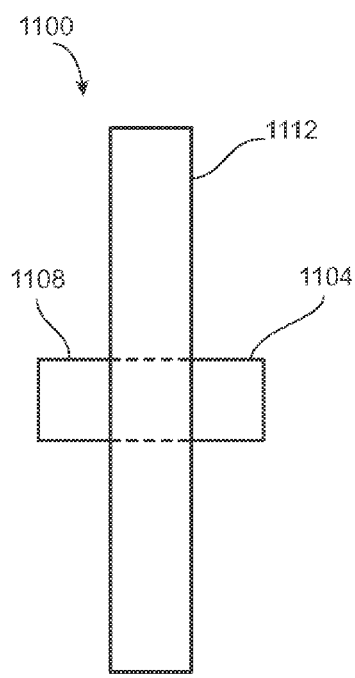
FIG. 11 is a side elevation view of an alignment pin that may be utilized in an interlocking frame rail system according to the present invention.

FIG. 11 is a side elevation view of an alignment pin 1100 that may be utilized in the interlocking frame rail system 700 according to the present invention. Viewed in connection with FIG. 7, the alignment pin 1100 may be disposed between the second side 710 of the first frame rail member 704 and the second side 711 of the second frame rail member 705. The alignment pin 1100 may generally include a first end 1108, a second end 1104, and a spacer member 1112 between the first end 1108 and the second end 1104. The first end 1108 may be configured for extending axially into a first aperture 770 located in the second side 710 of the first frame rail member 704. The second end 1104 may be configured for extending axially into a second aperture (not shown) located in the second side 711 of the second frame rail member 705, opposite to the corresponding first aperture 770. The alignment pin 1100 may be used to align the first frame rail member 704 and the second frame rail member 705, allowing the first frame rail member 704 and the second frame rail member 705 to be easily interlocked through the application of the connector member 900. The alignment pin 1100 may also aid in carrying any shear load applied vertically or horizontally to an interlocked first frame rail member 704 and second frame rail member 705. The spacer member 1112 of the alignment pin 1100 may be configured to provide the desired spacing between the first frame rail member 704 and the second frame rail member 705. The interlocking frame rail system 700 according to the present invention may include a plurality of such alignment pins 1100 disposed between the first frame rail member 704 and the second frame rail member 705. For this purpose, a plurality of corresponding first apertures 770 and second apertures may be provided in the respective first frame rail member 704 and second frame rail member 705.

Figure 12:
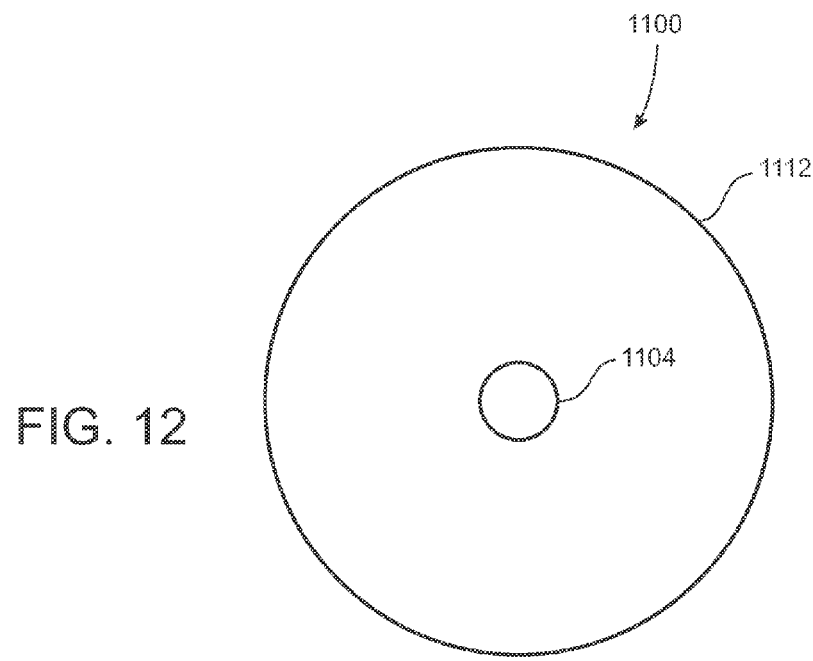
FIG. 12 is front elevation view of the alignment pin illustrated in FIG. 11.

FIG. 12 is a front elevation view of the alignment pin 1100 illustrated in FIG. 11. As shown in FIG. 12, the spacer member 1112 of the alignment pin 1100 may be circular in shape. The spacer member 1112 may generally be constructed of various materials, such as high-density polymers. Those skilled in the art will appreciate that the spacer member 1112 may be circular, rectangular, elliptical, or various other shapes.

Those of skill in the art will appreciate that the interlocking frame rail system 700 according to the present invention may be utilized to interlock various types of boat dock structures; e.g., walkways, boat docks, fingers, and the like. It will be understood that frame rail members as described above with respect to FIGS. 1 through 6 may be utilized in connection with the interlocking frame rail system 700 described herein. In one example, frame rail assemblies with removable rubrails may be secured to two adjoining sides of a boat dock structure. As discussed in further detail below in conjunction with FIGS. 14-15, a corner bumper member may be secured to one or more of the corresponding channels in the frame rail members of the adjoining sides of the boat dock structure. As another example, a user may secure frame rail members described herein to the sides of boat dock structures, and the user may utilize the frame rail members in connection with the interlocking frame rail system 700, or alternatively or additionally, removable rub-rail members may be secured to some or all of the frame rail members. All such methods entailing the use of the frame rail assemblies and/or interlocking frame rail systems 700 are encompassed by the present invention.

Figure 13:
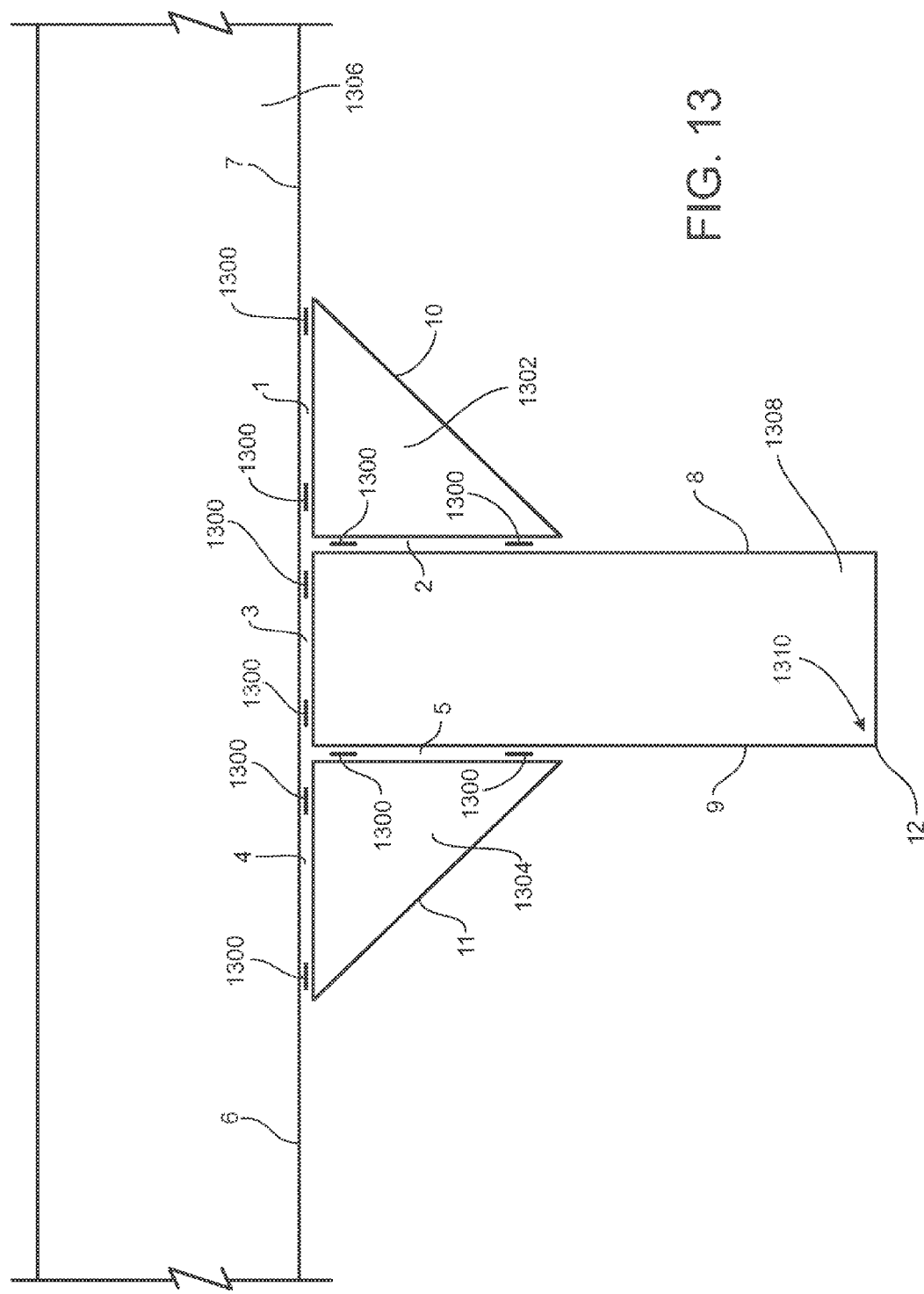
FIG. 13 is a top plan view of various boat dock structures, schematically depicting locations that may be fitted with frame rail assemblies and interlocking frame rail systems according to the present invention.

FIG. 13 is a top plan view of various boat dock structures, schematically depicting locations that may be fitted with frame rail assemblies and interlocking frame rail systems 700 according to the present invention. FIG. 13 schematically depicts a walkway 1306, a first brace structure 1302, a second brace structure 1304, and a finger 1308. Frame rail assemblies including removable rub-rail members according to the present invention may be secured to locations 6 through 11, for example. Interlocking frame rail systems 700 according to the present invention may be secured to locations 1 though 5, for example. An alignment pin 1300, or a plurality of alignment pins 1300, as described herein may be provided in the various interlocking frame rail systems 700.

Figure 14:
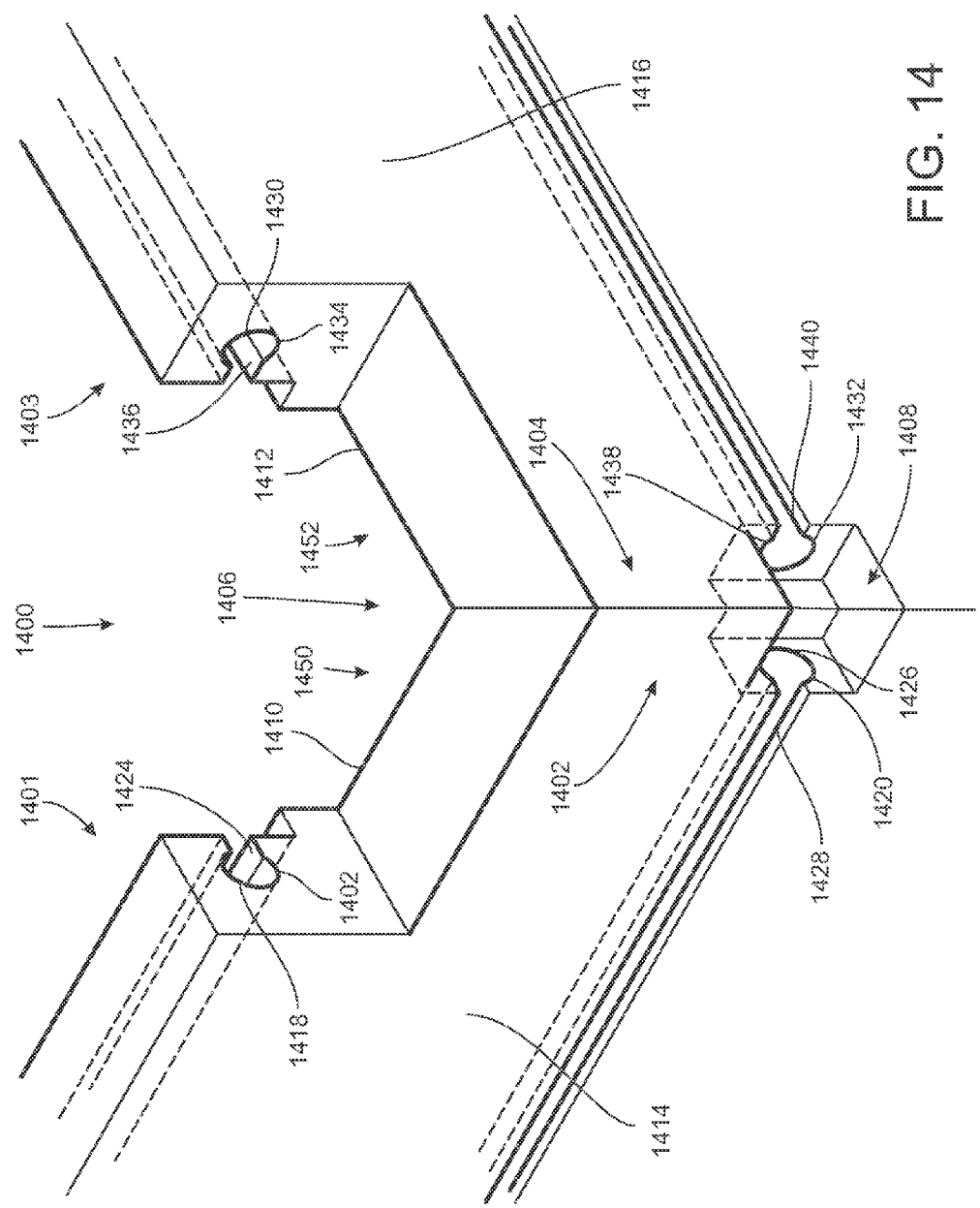
FIG. 14 is a perspective view of another implementation of a frame rail assembly according to the present invention, showing a first end of a first frame rail member adjoining a first end of a second frame rail member, and further showing a first gap and a second gap between the first end of the first frame rail member and the first end of the second frame rail member.

FIG. 14 is a perspective view of another implementation of a frame rail assembly 1400 according to the present invention, showing a first end 1402 of a first frame rail member 1401 adjoining a first end 1404 of a second frame rail member 1403, and further showing a first gap 1406 and a second gap 1408 between the first end 1402 of the first frame rail member 1401 and the first end 1404 of the second frame rail member 1403. The first gap 1406 may be positioned between an upper portion 1450 of the first end 1402 of the first frame rail member 1401 and an upper portion 1452 of the first end 1404 of the second frame rail member 1403. The second gap 1408 may generally be located below the first gap 1406. It will be understood that the first end 1402 of the first frame rail member 1401 is not necessarily in physical contact with the first end 1404 of the second frame rail member 1403. The first frame rail member 1401 may include a first side 1410 configured for securing the first frame rail member 1401 to a first side of a boat dock structure (not shown), and a second side 1414 opposing the first side 1410 of the first frame rail member 1401. The first frame rail member 1401 may include a first channel 1418 extending along a length of the first frame rail member 1401, and a second channel 1420 located generally below the first channel 1418 and extending along the length of the first frame rail member 1401. The first channel 1418 may include an inner section 1422 and an outer section 1424. The outer section 1424 may open at an outer surface (e.g., the first side 1410) of the first frame rail member 1401. The inner section 1422 may have a larger cross-sectional area than the outer section 1424. The second channel 1420 may include an inner section 1426 and an outer section 1428. The outer section 1428 may open at an outer surface (e.g., the second side 1414) of the first frame rail member 1401. The inner section 1426 may have a larger cross-sectional area than the outer section 1428.

The second frame rail member 1403 may include a first side 1412 configured for securing the second frame rail member 1403 to a second side of the boat dock structure (not shown), and a second side 1416 opposing the first side 1412 of the second frame rail member 1403. The first side of the boat dock structure and the second side of the boat dock structure may adjoin at a corner (see, for example, the corner 12 shown in FIG. 13) of the boat dock structure. The second frame rail member 1403 may include a first channel 1430 extending along a length of the second frame rail member 1403, and a second channel 1432 located generally below the first channel 1430 and extending along the length of the second frame rail member 1403. The first channel 1430 may include an inner section 1434 and an outer section 1436. The outer section 1436 may open at an outer surface (e.g., the first side 1412) of the second frame rail member 1403. The inner section 1434 may have a larger cross-sectional area than the outer section 1436. The second channel 1432 may include an inner section 1438 and an outer section 1440. The outer section 1440 may open at an outer surface (e.g., the second side 1416) of the second frame rail member 1403. The inner section 1438 may have a larger cross-sectional area than the outer section 1440. It will be understood that the first frame rail member 1401 and/or the second frame rail member 1403 may include any one or more of the features discussed above in conjunction with FIGS. 1-13.

FIG. 15 is a perspective view of a corner bumper member 1500 that may be utilized in conjunction with the frame rail assembly 1400 shown in FIG. 14 at a corner (e.g., the corner 12 shown in FIG. 13) of a boat dock structure. The corner bumper member 1500 may include a first section 1502 and a second section 1505. The first section 1502 may include a first side 1580 and a second side 1582 opposite the first side 1580. The first section 1502 may include a first coupling member 1504, a second coupling member 1506, and a resilient rub-rail portion 1508. The first coupling member 1504 may be configured for extending through the first channel 1418 of the first frame rail member 1401 (FIG. 14). The second coupling member 1506 may be configured for extending through the second channel 1420 of the first frame rail member 1401 (FIG, 14). The shapes of the first coupling member 1504 and the second coupling member 1506 may be complementary to the respective shapes of the first channel 1418 and the second channel 1420 of the first frame rail member 1401, such that the first section 1502 is limited to longitudinal insertion into and removal from the first frame rail member 1401. At least one of the first coupling member 1504 and the second coupling member 1506 may be located at the second side 1582. The rub-rail portion 1508 may project outward from the first side 1580. The rub-rail portion 1508 may include an outer bumper shell 1510 that may project outward from the first side 1580, and an inner rib 1512 disposed inside the outer bumper shell 1510. The inner rib 1512 may be configured for supporting the outer bumper shell 1510 upon heavy impact, and may be oriented so as to be less deformable than the outer bumper shell 1510. The outer bumper shell 1510 may be continuous along a length of the first section 1502.

The second section 1505 may include a first side 1584 and a second side 1586 opposite the first side 1584. The second section 1505 may include a first coupling member 1514, a second coupling member 1516, and a resilient rub-rail portion 1518. The first coupling member 1514 may be configured for extending through the first channel 1430 of the second frame rail member 1403 (FIG. 14). The second coupling member 1516 may be configured for extending through the second channel 1432 of the second frame rail member 1403 (FIG. 14). The shapes of the first coupling member 1514 and the second coupling member 1516 may be complementary to the respective shapes of the first channel 1430 and the second channel 1432 of the second frame rail member 1403, such that the second section 1504 is limited to longitudinal insertion into and removal from the second frame rail member 1403. At least one of the first coupling member 1514 and the second coupling member 1516 may be located at the second side 1586. The rub-rail portion 1518 may project outward from the first side 1584. The rub-rail. portion 1518 may include an outer bumper shell 1520 that may project outward from the first side 1584, and an inner rib 1522 disposed inside the outer bumper shell 1520. The inner rib 1522 may be configured for supporting the outer bumper shell 1520 upon heavy impact, and may be oriented so as to be less deformable than the outer bumper shell 1520. The outer bumper shell 1520 may be continuous along a length of the second section 1505.

As further illustrated in FIG. 15, in some implementations the corner bumper member 1500 may include a first removable insert 1524 and a second removable insert 1528. The first insert 1524 may be positioned within the outer bumper shell 1510 of the first section 1502. The first insert 1524 may be configured for maintaining the shape of the outer bumper shell 1510 (the outer bumper shell 1510 may have a tendency to deform over time due to prolonged exposure to the elements, for example) and/or to provide additional support upon heavy impact. The first insert 1524 may include a clearance channel 1526 extending along a length of the first insert 1524. The clearance channel 1526 may be configured for receiving the inner rib 1512 therein. The second insert 1528 may be positioned within the outer bumper shell 1520 of the second section 1518. The second insert 1528 may include a clearance channel 1530 extending along a length of the second insert 1528. The clearance channel 1530 may be configured for receiving the inner rib 1522 therein.

In some implementations, the corner bumper member 1500 may include a first aperture 1532 through the second section 1505, a second aperture 1534 through the second section 1505, a first aperture 1536 through the first section 1502, and a second aperture 1538 through the first section 1502. The first aperture 1532 through the second section 1505 may be configured for communicating with the first gap 1406 and aligning with the first channel 1418 of the first frame rail member 1401 (FIG. 14). A fastener (such as self-tapping screw or other appropriate fastener) may be secured within the first channel 1418 of the first frame rail member 1401 via the first aperture 1532, such that the fastener is adjacent to a first end 1540 of the first coupling member 1504 of the first section 1502. When the fastener is installed, the first coupling member 1504 of the first section 1502 may be firmly secured within the first channel 1418 of the first frame rail member 1401; i.e., the first coupling member 1504 may not be removed from the first channel 1418 until the fastener is removed from the first channel 1418 via the first aperture 1532 through the second section 1505.

The second aperture 1534 through the second section 1505 may be configured for communicating with the second gap 1408 and aligning with the second channel 1420 of the first frame rail member 1401 (FIG. 14). A fastener may be secured within the second channel 1420 of the first frame rail member 1401 via the second aperture 1534, such that the fastener is adjacent to a first end 1542 of the second coupling member 1506 of the first section 1502. When the fastener is installed, the second coupling member 1506 of the first section 1502 may be firmly secured within the second channel 1420 of the first frame rail member 1401; i.e., the second coupling member 1506 may not be removed from the second channel 1420 until the fastener is removed from the second channel 1420 via the second aperture 1534 through the second section 1505.

The first aperture 1536 through the first section 1502 may be configured for communicating with the first gap 1406 and aligning with the first channel 1430 of the second frame rail member 1403 (FIG. 14). A fastener may be secured within the first channel 1430 of the second frame rail member 1403 via the first aperture 1536, such that the fastener is adjacent to a first end 1544 of the first coupling member 1514 of the second section 1505. When the fastener is installed, the first coupling member 1514 of the second section 1505 may be firmly secured within the first channel 1430 of the second frame rail member 1403; i.e., the first coupling member 1514 may not be removed from the first channel 1430 until the fastener is removed from the first channel 1430 via the first aperture 1536 through the first section 1502.

The second aperture 1538 through the first section 1502 may be configured for communicating with the second gap 1408 and aligning with the second channel 1432 of the second frame rail member 1403 (FIG. 14). A fastener may be secured within the second channel 1432 of the second frame rail member 1403 via the second aperture 1538, such that the fastener is adjacent to a first end 1546 of the second coupling member 1516 of the second section 1505. When the fastener is installed, the second coupling member 1516 of the second section 1505 may be firmly secured within the second channel 1432 of the second frame rail member 1403; i.e., the second coupling member 1516 may not be removed from the second channel 1432 until the fastener is removed from the second channel 1432 via the second aperture 1538 through the first section 1502.

As further illustrated in FIG. 15, the corner bumper member 1500 may include a lip 1560 that is continuous along a top portion 1562 of the first section 1502 and a top portion 1564 of the second section 1505. The lip 1560 may extend inward from the first side 1410 of the first frame rail member 1401 and may extend inward from the first side 1412 of the second frame rail member 1403 (FIG. 14). The lip 1560 may generally be configured for covering a portion of a top surface (see the top surface 1310 in FIG. 13, for example) of the boat dock structure (not shown) about the corner (see the corner 12 in FIG. 13, for example) of the boat dock structure. For example, the lip 1560 may be utilized to hide imperfections in the ends of boards forming the top surface of the boat dock structure.

It will be understood that in some implementations, the rub-rail portion 1508 of the first section 1502 may be positioned adjacent a first rub-rail member (configured according to any of FIGS. 1-13 discussed above) on the first frame rail member 1401. The rub-rail portion 1518 of the second section 1505 may be positioned adjacent a second rub-rail member (configured according to any of FIGS. 1-13 discussed above) on the second frame rail member 1403. Various combinations of features are possible in light of the teachings of the present disclosure.

In general, terms such as "coupled to," and "configured for coupling to" and "secured to" and "in engagement with" (for example, a first component is "coupled to" or "is configured for coupling to" or is "secured to" or is "in engagement with" a second component) are used herein to indicate a structural, functional, mechanical, electrical, signal, optical, magnetic, electromagnetic, ionic or fluidic relationship between two or more components or elements. As such, the fact that one component is said to couple to a second component is not intended to exclude the possibility that additional components may be present between, and/or operatively associated or engaged with, the first and second components.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A frame rail assembly for a boat dock structure, the frame rail assembly comprising:

a first frame rail member comprising a first side configured for securing the first frame rail member to a first side of the boat dock structure, a second side opposing the first side, a first channel extending along a length of the first frame rail member, and a second channel below the first channel, the second channel extending along the length of the first frame rail member;

a second frame rail member comprising a first side configured for securing the second frame rail member to a second side of the boat dock structure, a second side opposing the first side, a first channel extending along a length of the second frame rail member, and a second channel below the first channel, the second channel extending along the length of the second frame rail member;

wherein a first end of the first frame rail member adjoins a first end of the second frame rail member at a corner; and a corner bumper member configured for positioning at the corner, comprising:
  a first section comprising a first coupling member, a second coupling member, and a resilient rub-rail portion projecting outward from the second side of the first frame rail member, wherein the first coupling member has a cross-section shaped complementarily to a cross-section of the first channel of the first frame rail member and extends through the first channel of the first frame rail member in engagement therewith, the second coupling member has a cross-section shaped complementarily to a cross-section of the second channel of the first frame rail member and extends through the second channel of the first frame rail member in engagement therewith, and the cross-sections of the first coupling member and the second coupling member are sized and shaped such that the first coupling member and the second coupling member are limited to longitudinal insertion into and removal from the first channel and the second channel, respectively; and
  a second section comprising a first coupling member, a second coupling member, and a resilient rub-rail portion projecting outward from the second side of the second frame rail member, wherein the first coupling member has a cross-section shaped complementarily to a cross-section of the first channel of the second frame rail member and extends through the first channel of the second frame rail member in engagement therewith, the second coupling member has a cross-section shaped complementarily to a cross-section of the second channel of the second frame rail member and extends through the second channel of the second frame rail member in engagement therewith, and the cross-sections of the first coupling member and the second coupling member are sized and shaped such that the first coupling member and the second coupling member are limited to longitudinal insertion into and removal from the first channel and the second channel, respectively, wherein:
    the rub-rail portion of the first section includes an outer bumper shell projecting outward from the second side of the first frame rail member, and an inner rib disposed inside the outer bumper shell but not attached to the outer bumper shell, and configured for supporting the outer bumper shell upon heavy impact, the inner rib being oriented so as to be less deformable than the outer bumper shell; and
    the rub-rail portion of the second section includes an outer bumper shell projecting outward from the second side of the second frame rail member, and an inner rib disposed inside the outer bumper shell but not attached to the outer bumper shell, and configured for supporting the outer bumper shell upon heavy impact, the inner rib being oriented so as to be less deformable than the outer bumper shell;
  a first gap between an upper portion of the first end of the first frame rail member and an upper portion of the first end of the second frame rail member;
  a second gap between the first end of the first frame rail member and the first end of the second frame rail member, wherein the second gap is located below the first gap;
  a first aperture through the second section in communication with the first gap and in alignment with the first channel of the first frame rail member, wherein the first aperture is configured for receiving a fastener to be secured within the first channel of the first frame rail member;
  a second aperture through the second section in communication with the second gap and in alignment with the second channel of the first frame rail member, wherein the second aperture is configured for receiving a fastener to be secured within the second channel of the first frame rail member;
  a first aperture through the first section in communication with the first gap and in alignment with the first channel of the second frame rail member, wherein the first aperture is configured for receiving a fastener to be secured within the first channel of the second frame rail member; and
  a second aperture through the first section in communication with the second gap and in alignment with the second channel of the second frame rail member, wherein the second aperture is configured for receiving a fastener to be secured within the second channel of the second frame rail member.

2. The frame rail assembly of claim 1, wherein the outer bumper shell of the first section is continuous along a length of the first section and the outer bumper shell of the second section is continuous along a length of the second section.

3. The frame rail assembly of claim 1, comprising:
a first removable insert positioned inside the outer bumper shell of the first section, wherein the first removable insert is configured for maintaining the shape of the outer bumper shell of the first section, and the first removable insert includes a clearance channel extending along a length of the first removable insert, the clearance channel being configured for receiving the inner rib therein; and
a second removable insert positioned inside the outer bumper shell of the second section, wherein the second removable insert is configured for maintaining the shape of the outer bumper shell of the second section, and the second removable insert includes a clearance channel extending along a length of the second removable insert, the clearance channel being configured for receiving the inner rib therein.

4. The frame rail assembly of claim 1, wherein:
the first channel and the second channel of the first frame rail member each comprise an outer section and an inner section of larger cross-sectional area than the outer section; and
the first channel and the second channel of the second frame rail member each comprise an outer section and an inner section of larger cross-sectional area than the outer section.

5. The frame rail assembly of claim 1, wherein at least one of the first channel of the first frame rail member, the second channel of the first frame rail member, the first channel of the second frame rail member, and the second channel of the second frame rail member includes a fastener secured therein.

6. The frame rail assembly of claim 1, wherein the corner bumper member comprises a lip that is continuous along a top portion of the first section and a top portion of the second section, wherein the lip extends inward from the first side of the first frame rail member and the first side of the second frame rail member, and wherein the lip is configured for covering a portion of a top surface of the boat dock structure about the corner.

7. The frame rail assembly of claim 1, comprising:
a first removable resilient rub-rail member projecting outward from the second side of the first frame rail member and extending along a portion of the length of the first frame rail member, the first rub-rail member being positioned adjacent the first section of the corner bumper member, the first rub-rail member comprising a first coupling member extending through the first channel of the first frame rail member in engagement therewith, and a second coupling member extending through the second channel of the first frame rail member in engagement therewith; and
a second removable resilient rub-rail member projecting outward from the second side of the second frame rail member and extending along a portion of the length of the second frame rail member, the second rub-rail member being positioned adjacent the second section of the corner bumper member, the second rub-rail member comprising a first coupling member extending through the first channel of the second frame rail member in engagement therewith, and a second coupling member extending through the second channel of the second frame rail member in engagement therewith.

8. The frame rail assembly of claim 7, wherein the first rub-rail member is adjacent to the rub-rail portion of the first section of the corner bumper member, and the second rub-rail member is adjacent to the rub-rail portion of the second section of the corner bumper member.

9. The frame rail assembly of claim 7, wherein the first rub-rail member and the second rub-rail member each include a lip that is continuous along a top portion thereof.

10. A corner bumper member for a first frame rail member and a second frame rail member of a boat dock structure, the corner bumper member comprising:
a first section comprising a first side, a second side opposing the first side, a first coupling member, a second coupling member and a resilient rub-rail portion, the first coupling member being configured for extending through a first channel of the first frame rail member of the boat dock structure, the second coupling member being configured for extending through a second channel of the first frame rail member, and the rub-rail portion projecting outward from the second side, wherein the first coupling member has a cross-section shaped complementarily to a cross-section of the first channel of the first frame rail member, the second coupling member has a cross-section shaped complementarily to a cross-section of the second channel of the first frame rail member, and the cross-sections of the first coupling member and the second coupling member are sized and shaped such that the first coupling member and the second coupling member are limited to longitudinal insertion into and removal from the first channel and the second channel, respectively; and
a second section comprising a first side, a second side opposing the first side, a first coupling member, a second coupling member and a resilient rub-rail portion, the first coupling member being configured for extending through a first channel of the second frame rail member of the boat dock structure, the second coupling member being configured for extending through a second channel of the second frame rail member, and the rub-rail portion projecting outward from the second side, wherein the first coupling member has a cross-section shaped complementarily to a cross-section of the first channel of the second frame rail member, the second coupling member has a cross-section shaped complementarily to a cross-section of the second channel of the second frame rail member, and the cross-sections of the first coupling member and the second coupling member are sized and shaped such that the first coupling member and the second coupling member are limited to longitudinal insertion into and removal from the first channel and the second channel, respectively;
wherein the first section adjoins the second section at a corner, and wherein:
the rub-rail portion of the first section includes an outer bumper shell, and an inner rib disposed inside the outer bumper shell but not attached to the outer bumper shell, and configured for supporting the outer bumper shell upon heavy impact, the inner rib being oriented so as to be less deformable than the outer bumper shell; and
the rub-rail portion of the second section includes an outer bumper shell, and an inner rib disposed inside the outer bumper shell but not attached to the outer bumper shell, and configured for supporting the outer bumper shell upon heavy impact, the inner rib being oriented so as to be less deformable than the outer bumper shell;
a first aperture through the second section configured for communicating with a first gap, wherein the first gap is present between an upper portion of a first end of the first frame rail member and an upper portion of a first end of the second frame rail member, the first aperture being further configured for aligning with the first channel of the first frame rail member and for receiving a fastener to be secured within the first channel of the first frame rail member;
a second aperture through the second section configured for communicating with a second gap between the first end of the first frame rail member and the first end of the second frame rail member, wherein the second gap is present below the first gap, the second aperture being further configured for aligning with the second channel of the first frame rail member and for receiving a fastener to be secured within the second channel of the first frame rail member;
a first aperture through the first section configured for communicating with the first gap, the first aperture being further configured for aligning with the first channel of the second frame rail member and for receiving a fastener to be secured within the first channel of the second frame rail member; and
a second aperture through the first section configured for communicating with the second gap and aligning with the second channel of the first frame rail member, wherein the second aperture is further configured for receiving a fastener to be secured within the second channel of the second frame rail member.

11. The corner bumper member of claim 10, wherein the outer bumper shell of the first section is continuous along a length of the first section and the outer bumper shell of the second section is continuous along a length of the second section.

12. The corner bumper member of claim 10, comprising:
a first removable insert positioned inside the outer bumper shell of the first section, wherein the first removable insert is configured for maintaining the shape of the outer bumper shell of the first section, and the first removable insert includes a clearance channel extending along a length of the first removable insert, the clearance channel being configured for receiving the inner rib therein; and
a second removable insert positioned inside the outer bumper shell of the second section, wherein the second removable insert is configured for maintaining the shape of the outer bumper shell of the second section, and the second removable insert includes a clearance channel extending along a length of the second removable insert, the clearance channel being configured for receiving the inner rib therein.

13. The corner bumper member of claim 10, wherein:
the first coupling member of the first section is shaped complementarily to a shape of the first channel of the first frame rail member that includes an inner section and an outer section wherein the inner section has a larger cross-sectional area than the outer section, and the second coupling member of the first section is shaped complementarily to a shape of the second channel of the first frame rail member that includes an inner section and an outer section wherein the inner section has a larger cross-sectional area than the outer section; and
the first coupling member of the second section is shaped complementarily to a shape of the first channel of the second frame rail member that includes an inner section and an outer section wherein the inner section has a larger cross-sectional area than the outer section, and the second coupling member of the second section is shaped complementarily to a shape of the second channel of the second frame rail member that includes an inner section and an outer section wherein the inner section has a larger cross-sectional area than the outer section.

14. The corner bumper member of claim 10, comprising a lip that is continuous along a top portion of the first section and a top portion of the second section, wherein the lip extends inward from the second side of the first section and the second side of the second section and wherein the lip is configured for covering a portion of a top surface of the boat dock structure about the corner.

15. A frame rail assembly for a boat dock structure, the frame rail assembly comprising:
a first frame rail member comprising a first side configured for securing the first frame rail member to a first side of the boat dock structure, a second side opposing the first side, a first channel extending along a length of the first frame rail member, and a second channel below the first channel, the second channel extending along the length of the first frame rail member;
a second frame rail member comprising a first side configured for securing the second frame rail member to a second side of the boat dock structure, a second side opposing the first side, a first channel extending along a length of the second frame rail member, and a second channel below the first channel, the second channel extending along the length of the second frame rail member;
wherein a first end of the first frame rail member adjoins a first end of the second frame rail member at a corner;
a corner bumper member configured for positioning at the corner, comprising:
a first section comprising a first coupling member extending through the first channel of the first frame rail member in engagement therewith, a second coupling member extending through the second channel of the first frame rail member in engagement therewith, and a resilient rub-rail portion projecting outward from the second side of the first frame rail member; and
a second section comprising a first coupling member extending through the first channel of the second frame rail member in engagement therewith, a second coupling member extending through the second channel of the second frame rail member in engagement therewith, and a resilient rub-rail portion projecting outward from the second side of the second frame rail member
a first gap between an upper portion of the first end of the first frame rail member and an upper portion of the first end of the second frame rail member;
a second gap between the first end of the first frame rail member and the first end of the second frame rail member, wherein the second gap is located below the first gap;
a first aperture through the second section in communication with the first gap and in alignment with the first channel of the first frame rail member, wherein the first aperture is configured for receiving a fastener to be secured within the first channel of the first frame rail member;
a second aperture through the second section in communication with the second gap and in alignment with the second channel of the first frame rail member, wherein the second aperture is configured for receiving a fastener to be secured within the second channel of the first frame rail member;
a first aperture through the first section in communication with the first gap and in alignment with the first channel of the second frame rail member, wherein the first aperture is configured for receiving a fastener to be secured within the first channel of the second frame rail member; and
a second aperture through the first section in communication with the second gap and in alignment with the second channel of the second frame rail member, wherein the second aperture is configured for receiving a fastener to be secured within the second channel of the second frame rail member.

16. The frame rail assembly of claim 15, wherein at least one of the first channel of the first frame rail member, the second channel of the first frame rail member, the first channel of the second frame rail member, and the second channel of the second frame rail member includes a fastener secured therein.

17. The frame rail assembly of claim 15, comprising:
a first removable insert positioned inside the outer bumper shell of the first section, wherein the first removable insert is configured for maintaining the shape of the outer bumper shell of the first section, and the first removable insert includes a clearance channel extending along a length of the first removable insert, the clearance channel being configured for receiving the inner rib therein; and a second removable insert positioned inside the outer bumper shell of the second section, wherein the second removable insert is configured for maintaining the shape of the outer bumper shell of the second section, and the second removable insert includes a clearance channel extending along a length of the second removable insert, the clearance channel being configured for receiving the inner rib therein.

18. A corner bumper member for a first frame rail member and a second frame rail member of a boat dock structure, the corner bumper member comprising:

a first section comprising a first side, a second side opposing the first side, a first coupling member, a second coupling member and a resilient rub-rail portion, the first coupling member being configured for extending through a first channel of the first frame rail member of the boat dock structure, the second coupling member being configured for extending through a second channel of the first frame rail member, and the rub-rail portion projecting outward from the second side;

a second section comprising a first side, a second side opposing the first side, a first coupling member, a second coupling member and a resilient rub-rail portion, the first coupling member being configured for extending through a first channel of the second frame rail member of the boat dock structure, the second coupling member being configured for extending through a second channel of the second frame rail member, and the rub-rail portion projecting outward from the second side;

wherein the first section adjoins the second section at a corner;

a first aperture through the second section configured for communicating with a first gap, wherein the first gap is present between an upper portion of a first end of the first frame rail member and an upper portion of a first end of the second frame rail member, the first aperture being further configured for aligning with the first channel of the first frame rail member and for receiving a fastener to be secured within the first channel of the first frame rail member;

a second aperture through the second section configured for communicating with a second gap between the first end of the first frame rail member and the first end of the second frame rail member, wherein the second gap is present below the first gap, the second aperture being further configured for aligning with the second channel of the first frame rail member and for receiving a fastener to be secured within the second channel of the first frame rail member;

a first aperture through the first section configured for communicating with the first gap, the first aperture being further configured for aligning with the first channel of the second frame rail member and for receiving a fastener to be secured within the first channel of the second frame rail member; and a second aperture through the first section configured for communicating with the second gap and aligning with the second channel of the first frame rail member, wherein the second aperture is further configured for receiving a fastener to be secured within the second channel of the second frame rail member.

19. The corner bumper member of claim 18, comprising:

a first removable insert positioned inside the outer bumper shell of the first section, wherein the first removable insert is configured for maintaining the shape of the outer bumper shell of the first section, and the first removable insert includes a clearance channel extending along a length of the first removable insert, the clearance channel being configured for receiving the inner rib therein; and a second removable insert positioned inside the outer bumper shell of the second section, wherein the second removable insert is configured for maintaining the shape of the outer bumper shell of the second section, and the second removable insert includes a clearance channel extending along a length of the second removable insert, the clearance channel being configured for receiving the inner rib therein.

* * * * *